United States Patent [19]

Hiketa et al.

[11] Patent Number: 5,583,539
[45] Date of Patent: Dec. 10, 1996

[54] ITEM SELECTION SIGNAL INPUT APPARATUS THAT REDUCES THE PROCESSING LOAD OF A HOST COMPUTER

[75] Inventors: Hitoshi Hiketa; Minoru Yoshida; Junichi Hasegawa, all of Nara-ken, Japan

[73] Assignee: Sharp Kabushiki Kaisha, Osaka, Japan

[21] Appl. No.: 635,200

[22] Filed: Jan. 2, 1991

[30]    Foreign Application Priority Data

| Jan. 10, 1990 | [JP] | Japan | 2-3135 |
| Jan. 10, 1990 | [JP] | Japan | 2-3136 |
| Feb. 28, 1990 | [JP] | Japan | 2-48702 |
| Feb. 28, 1990 | [JP] | Japan | 2-48703 |

[51] Int. Cl.$^6$ ............................. G09G 5/00
[52] U.S. Cl. ........................... 345/146; 345/173
[58] Field of Search ................... 340/712, 711; 345/146, 173; 395/156; 364/927.64, 928.5, 345

[56]        References Cited

U.S. PATENT DOCUMENTS

| 4,028,695 | 6/1977 | Saich . |
| 4,520,583 | 6/1985 | Oka . |
| 4,763,356 | 8/1988 | Day, Jr. et al. ................. 340/712 |
| 4,853,888 | 8/1989 | Lata et al. ........................ 341/23 |
| 4,908,612 | 3/1990 | Bromley et al. ................. 340/712 |

FOREIGN PATENT DOCUMENTS

| 58-14686 | 3/1983 | Japan . |
| 60-37487 | 8/1985 | Japan . |
| 61-26975 | 8/1986 | Japan . |
| 2-51720 | 2/1990 | Japan . |

*Primary Examiner*—Jeffery Brier
*Attorney, Agent, or Firm*—Nixon & Vanderhye P.C.

[57]        ABSTRACT

An item selection signal input apparatus enabling an operator to communicate with a data processor is disclosed. This apparatus includes a variable format display panel, a transparent keyboard panel provided on a display screen, a memory for storing data representing a plurality of screen formats to be displayed, a display controller for selecting the screen format to be displayed next from the displayed screen and the panel selected by the operator and providing the same to the variable format display, an output device for providing to the data processor a message defined according to the entry from the keyboard and the displayed screen format, a driver for driving IC cards having back-up power, and a transfer device for distributing and transferring the contents stored in the IC card to the data memory, the display controller, and the output device. Data required for operation is stored in the IC card in advance. It is not necessary to receive data required for operation from the data processor.

26 Claims, 14 Drawing Sheets

FIG. 8

| PAGE NUMBER | SCREEN NUMBER | ITEM NUMBER (OUTPUT CODE) | ITEM START POSITION HORIZONTAL | VERTICAL | ITEM SIZE | | SCREEN SWITCHING PAGE | SCREEN | CODE OUTPUT FLAG | DISPLAY DATA |
|---|---|---|---|---|---|---|---|---|---|---|
| 1 | 1 | 1 | 0 | 0 | 1 | 2 | 0 | 0 | 1 | "A" |
| | | 2 | 5 | 2 | 2 | 3 | 1 | 2 | 1 | "B" |
| | | 3 | 3 | 8 | 1 | 1 | 0 | 0 | 0 | "C" |
| | | ... | | | | | | | | |
| | | 30 | 10 | 5 | 3 | 2 | 5 | 1 | 1 | "J" |
| | 3 | 1 | 0 | 0 | 5 | 5 | 1 | 1 | 0 | |
| | | 2 | 5 | 5 | 3 | 2 | 2 | 1 | 1 | |
| 10 | 1 | 1 | 0 | 0 | 10 | 7 | 5 | 1 | 1 | "CPU" |

FIG. 9

| HARD CODE | OUTPUT CODE |
|---|---|
| 01 | 10 |
| 02 | 7 |
| 03 | 23 |
| ... | ... |
| 206 | 80 |

FIG.15

| Page Number | Screen Number | Item Number (Soft Code) | Item Start Position | | Item Size | | Screen Switching Page | Screen Output Flag | Buzzer Control Code | Display Control Flag | Character Reversion Brightness Flag | Display Data |
|---|---|---|---|---|---|---|---|---|---|---|---|---|
| | | | | | Horizontal | Vertical | | | | | | |
| 1 | 1 | 1 | 0 | 0 | 1 | 2 | 0 | 1 | 1 | 1 | 0 | "A" |
| | | 2 | 5 | 2 | 2 | 3 | 1 | 1 | 2 | 1 | 0 | "B" |
| | | 3 | 3 | 8 | 1 | 1 | 0 | 0 | 0 | 0 | 1 | "C" |
| | | ... | ... | ... | ... | ... | ... | ... | ... | ... | ... | ... |
| | | 30 | 10 | 5 | 3 | 2 | 5 | 1 | 0 | 0 | 0 | "J" |
| | 3 | 1 | 0 | 0 | 5 | 5 | 1 | 0 | 2 | 1 | 1 | |
| | | 2 | 5 | 5 | 3 | 2 | 2 | 1 | 1 | 1 | 0 | |
| | | ... | ... | ... | ... | ... | ... | ... | ... | ... | ... | ... |
| 10 | 1 | 1 | 0 | 0 | 10 | 7 | 5 | 1 | 2 | 1 | 0 | "CPU" |

| HARD CODE | OUTPUT CODE |
|---|---|
| 01 | 10 |
| 02 | 07 |
| 03 | -1 |
| 04 | 23 |
| 05 | 06 |
| 06 | -2 |
| 07 | -3 |
| ⋮ | ⋮ |
| 205 | 80 |
| 206 | 80 |

ITEM SELECTION SIGNAL INPUT APPARATUS THAT REDUCES THE PROCESSING LOAD OF A HOST COMPUTER

BACKGROUND OF THE INVENTION

1. Field of the Invention

The present invention relates to item selection signal input apparatus for applying information indicating a selected one of a plurality of items to a host computer. The invention particularly relates to an item selection signal input apparatus having a display device and a transparent touch panel formed on a screen of the display device that allows the touch panel to function as an input apparatus of a plurality of types according to the picture of the keyboard displayed on the screen.

2. Description of the Related Art

There is an item selection signal input apparatus that can provide information associated with a selected one of a plurality of items to a computer, as an equipment for providing information to a computer, in addition to those of full keyboard. Various item selection signal input apparatus have been proposed up till the present date.

A first type of an item selection signal input apparatus comprises a frame having a transparent touch panel on the upper plane, a plurality of sheets prepared in advance within the frame having item names and the like denoted thereon, and a device selecting one of the sheets according to the aspect of the process for mechanically unfolding the sheet under the transparent touch panel.

Such a type of item selection signal input apparatus are disclosed in U.S. Pat. No. 4,520,583 and Japanese Utility Model Publication No. 61-26975, for example.

In the above-mentioned apparatus, a specific sheet is unfolded beneath the touch panel according to an instruction from an application program of the computer. By selecting one of the items denoted on the unfolded sheet and depressing the touch panel over that item, information indicating which part of the touch panel has been depressed is notified to the application program of the host computer.

The application program compares the notified information with the information stored in advance indicating the items denoted on the current unfolded sheet and its locations to identify which item has been selected.

The usage of sheets having item names denoted enables operators to easily select an item name. In most cases, the necessary information can be entered by depressing the key only once. Such item selection signal input apparatus allow people who are not familiar with computers to easily enter information to the computer.

The above-mentioned item selection signal input apparatus had the inconvenience that it was not easy to modify the item name or the arrangement of the items denoted on the sheet.

To solve such inconvenience, item selection signal input apparatus displaying item names electrically are disclosed in U.S. Pat. No. 4,028,695, Japanese Patent Publication No. 60-37487, and Japanese Patent Laying-Open No. 2-51720, for example. The first two of the above mentioned documents are disclosed prior to the present invention. The last one (disclosed on Feb. 21, 1990) is prior to only two out Of the four Japanese applications which is the present application is based on declaring its priority.

The present invention is considered as an improvement to that described in Japanese Patent Laying-Open No. 2-51720. The item selection signal input apparatus described in this publication (referred to as a "touch panel device" therein) will be explained hereinafter associated with the present application. As stated above, it is to be noted that the technique described in that publication is prior to only one part of the invention claimed in the present application.

Referring to FIG. 1, an item selection signal input apparatus 31 according to the related art comprises an item input screen 32 and a screen switching key 33. The item input screen 32 comprises a liquid crystal display device (LCD) for selectively displaying one out of a plurality of pictures each indicating a specific key arrangement, and a transparent touch panel formed over the screen of the LCD. Screen switching keys 33 are provided for requesting the display of a desired screen on the LCD. The desired screen is displayed on the LCD by depressing one of the screen switching keys 33.

Assume that an area over a desired key out of the displayed keys on the touch panel is depressed. The touch panel comprises two sheets having a predetermined number of rectangular transparent electrodes aligned in one direction spaced equally. Both sheets are disposed opposing each other at a fine distance so that the alignment of the transparent electrodes are orthogonal to each other for forming a matrix of transparent electrodes. By depressing the transparent touch panel to bend the transparent electrode of the upper plane, the upper and lower transparent electrodes at that position contact to be conductive. The location of the touch panel which was pressed can be identified by detecting which transparent electrode is conductive. The item selection signal input apparatus encodes the obtained information indicating the depressed location and provides the resulting signal to a host computer 26 via an I/O bus 27.

Item selection signal input apparatus 31 also comprises a memory not shown. This memory stores data comprising a plurality of pictures of key arrangements to be displayed on an item input screen 32, and key definitions. In other words, this item selection signal input apparatus employs pictures stored in a memory and displayed on a LCD instead of the aforementioned sheet having item names and the like denoted thereon.

It may be necessary to enter a plurality of data in sequence such as a large item, a middle item, and then a small item in order regarding a particular subject in item selection signal input apparatus 31. In such cases, automatic switching of the screen is carried out according to the method shown in FIG. 2 so that the operator does not have to bother to select screen switching keys 33.

This screen automatic switching method is described hereinafter. Referring to FIG. 2, when a specific key item showing a specific key arrangement in the screen is selected by depressing the transparent touch panel in item selection signal input apparatus 31 (refer to (a)), an item code corresponding to the key item is applied to the side of host computer 26 (refer to (b)).

Host computer 26 analyzes the applied item code according to the screen selection application program provided in advance for the above-mentioned particular subject (refer to (c)). When determination is made that the display screen is to be changed to another one according to the analyzed result, the application program first selects the screen that should be newly displayed. Host computer 26 provides the specification of the selected screen and the command to switch the screen to item selection signal input apparatus 31 (refer to (d)).

Item selection signal input apparatus 31 receives the command to switch the screen from the host computer, to read out the data of the specified screen from the memory and displays the same on the LCD (refer to (e)).

There is an alternative method where item selection signal input apparatus 31 displays the specified screen without the help of the host computer on the depression of screen switching key 33. The operator may depress the screen switching key 33 corresponding to the screen including the desired item key.

This method requires that the operator is aware of all screens and the screen switching keys corresponding to each screen, and of the key allocation displayed on all screen. If not, the entry operation will be very bothersome. The aforementioned method of switching the screen with the aid of the host computer is therefore preferable.

The data stored in the memory of the aforementioned item selection signal input apparatus has close relation with the application program. The following methods are considered as the possible methods of storing data in the memory of the item selection signal input apparatus.

(a) At the time of system power-up, data is transferred to the item selection signal input apparatus from the host computer. The transferred data is stored in the memory of the item selection signal input apparatus.

(b) After the data transfer of the above-mentioned (a), power supply to the memory of the item selection signal input apparatus is maintained. That is to say, back-up power is provided in the item selection signal input apparatus so that the data transferred from the host computer is held in the memory even after the power of the item selection signal input apparatus is turned off.

(c) The required data is written into a ROM (Read Only Memory) and the like. The back-up power supply described in (b) is not necessary in this case.

The following problems are still not solved in operating the item selection signal input apparatus according to the above-mentioned methods.

A conventional item selection signal input apparatus 31 carries out the switching of the key arrangement screen according the screen switching command from host computer 26. Because it is necessary to generate the screen switching command according to the application program, host computer 26 is under load to hinder the operation processing function that host computer 26 is to principally carry out.

For example, an operator may wish to display another screen B temporarily when he/she is carrying out a particular process at a certain screen A. In this case, the information that the prior screen is screen A must be stored by the application program to return to screen A after moving to screen B. It is necessary to identify which screen is displayed in the item selection signal input apparatus by the application program. This will complicate the application program and burden the designer of the application program.

The screen switching command can not be generated by item selection signal input apparatus 31 itself. This command is generated when a specific item code is applied to host computer 26 from item selection signal input apparatus 31. It is not possible to automatically switch the key arrangement screen one after another without entering any key item in item selection signal input apparatus 31. There is no way other than to operate in a manual manner in this case.

However, the method of switching the screen in a manual manner includes the following problem. As stated before, the operator must remember which screen is the screen to return to after switching from screen A to screen B temporarily. The operator must also be aware of which screen switching key must be depressed to return to the prior screen. This is a burden to the operator.

The method of providing picture data displaying the key arrangement and data for defining the functions of the keys to a conventional item selection signal input apparatus has the following problems.

According to the method of transferring data to the item selection signal input apparatus from the host computer every time the system is powered-up, the machine time of the host computer is consumed only for the purpose of this process. Furthermore, the item selection signal input apparatus can not be used until this process ends. Particularly in a system including one computer and a plurality of item selection signal input apparatus connected to this computer, data must be transferred to each of item selection signal input apparatus from the computer, which is time consuming furthermore.

According to the method of maintaining the transferred data stored in the memory by a back-up power supply, the operation of transferring data from the computer each time the system is powered up can be omitted. However, the necessity of back-up power will increase the cost of the apparatus.

The method of writing data into a ROM comprises the problems that the apparatus is costly and can not be easily adapted to a plurality of applications due to the data being fixed.

There is also the inconvenience that a conventional item selection signal input apparatus is not implemented so as to automatically inform the operator whether the data entered by depressing the panel is accepted by the computer, due to reasons such as the structure of the apparatus will become too complicated. The only way for ensuring the entry is that the operator must take great care in depressing the key properly.

Some item selection signal input apparatus issue a bleep automatically on detecting the depression of a panel. However, this bleep on every detection may distract the operator. In addition, confirmation whether the proper key is depressed or not was not easy because the same bleep was sounded regardless of the type of the key.

It was not possible to adapt the conventional item selection signal input apparatus to many applications with improved operability, without increasing the load of the host computer.

SUMMARY OF THE INVENTION

In view of the foregoing, an object of the present invention is to provide an item selection signal input apparatus capable of being adapted with ease to applications wider than that of conventional ones with operability higher than that of conventional one, without increasing the load of the host computer.

Another object of the present invention is to provide an item selection signal input apparatus that can reduce the amount of data communication between the host computer.

A further object of the present invention is to provide an item selection signal input apparatus that can automatically display a predetermined key picture without instructions from the host computer.

A still further object of the present invention is to provide an item selection signal input apparatus that can interruptively display the picture of a key arrangement without burdening the host computer.

An additional object of the present invention is to provide an economical item selection signal input apparatus that does not have to receive the data necessary for key arrangement display every time the system is powered up.

Another object of the present invention is to provide an economical item selection signal input apparatus that can be adapted to a wide range of applications in ease without having to receive data necessary for key arrangement display from the host computer every time the system is powered up.

Yet another object of the present invention is to provide an item selection signal input apparatus that can distribute with ease the data necessary for key arrangement display to a plurality of item selection signal input apparatus while suppressing transmission from the host computer to the minimum.

An additional object of the present invention is to provide an item selection signal input apparatus that can facilitate operation confirmation by the operator, and that can change the confirmation manner by operated keys.

An item selection signal input apparatus according to the present invention includes a variable format display device having a display screen for displaying a selected one of a plurality of screen formats on the display screen; a transparent keyboard panel provided on the display screen having a plurality of manually selectable zone panels, wherein the keyboard panel includes a device for providing a selection signal indicating the selected zone panel in response to the selection of the zone panel; a memory device for storing screen format data representing a plurality of screen formats; a display controller responsive to a selection signal for controlling the variable format display device to select the next screen formats out of a plurality of screen formats, and displaying the selected next screen format on the display screen; an output device responsive to the selection signal and the variable format display device for providing to a data processor the message selected according to the selection signal and the screen format displayed on the display screen; a driver receiving detachably an external memory device that can hold its own memory alone for interface between the external memory device and the memory device, the display controller, and the output device; and a data transfer device for dividing and transferring the contents stored in the external memory device attached to the driver to the memory device, the display controller, and the output device.

The item selection signal input apparatus having the above-mentioned structure can transfer the contents stored in the external memory device attached to the driver to the memory device, the display controller, and the output device. The item selection signal input apparatus changes the display format, analyzes and provides to the data processor the meaning of the selected zone panel, according to the data transferred to the memory device, the display controller, and the output device. The item selection signal input apparatus does not require instruction from the data processor in switching the screen. This can reduce the amount of communication between the item selection signal input apparatus and the data processor.

The item selection signal input apparatus according to a preferred embodiment of the present invention further includes a receiver for receiving data from the data processor, and a device for writing the received data into the external memory device attached to the driver.

The item selection signal input apparatus having the above structure can directly receive data required for operation from the data processor and write it into the external memory device. It is not necessary to receive data required for operation from the computer once the data is received. Setting the external memory device to the driver is required only. Accordingly, the communication amount with the data processor is reduced, and provision of data required for the operation of the item selection signal input apparatus will be done in ease.

According to another preferred embodiment of the present invention, the item selection signal input apparatus includes a second driver that can be detachably attached to a second external memory device that can hold its own memory alone for driving the second external memory device and writing data into the second external memory device, and a data transfer device for transferring data from the driver to the second driver.

The item selection signal input apparatus having the above structure can write data into the second external memory device with the data transfer device via the driver and the second driver, from the external memory device where data received from the data processor is written. The provision of the external memory device having data written therein to another item selection signal input apparatus of the present invention eliminates the need to receive data required for operation from the data processor in other item selection signal input apparatus. The number of input selection signal input apparatus that requires the reception of data necessary for operation from the data processor is reduced. The capacity of the data processor used for data transfer is reduced so that the data processor can be devoted to more of its principal function.

According to another aspect of the present invention, the item selection signal input apparatus includes a variable format display device having a display screen for displaying a selected one of a plurality of screen formats on the display screen; a transparent keyboard panel provided on the display screen having a plurality of manually selectable zone panels, wherein the keyboard panel includes a device for providing a selection signal indicating the selected zone panel in response to the selection of the zone panel; a memory device for storing screen format data representing a plurality of screen formats; a display controller responsive to the selection signal for controlling the variable format display device to select the next screen format out of a plurality of screen formats and display on the display the selected next screen format; and an output device responsive to the selection signal and the variable format display device for providing to the data processor a message selected according to the selection signal and the screen format displayed on the display screen. The display controller includes a screen format identification signal memory device for storing and providing a screen format identification signal to identify the selected screen format, a next-screen-table memory device for storing a next screen table including screen format selection information to specify the screen format to be displayed next, the next screen table being prepared keyed to the combination of the value of the selection signal and the screen format, a retrieval device responsive to the screen format identification signal and the selection signal to search the next screen table for retrieving the identification information of the screen format to be displayed next, and a device for deriving the screen format data specified by the screen format identification information provided from the retrieval device, from the data memory device to provide the same to the variable format display device.

According to the item selection signal input apparatus having the above-mentioned structure, information for identifying the currently displayed screen format is held without the assistance of the data processor. The next screen table keyed to the combination of the value of the selection signal and the screen format is written in advance in the next-screen-table memory device. The item selection signal input apparatus can therefore be informed of the screen to be displayed next by the information of the screen format currently displayed and by selection signal from the keyboard panel, without the assistance of the data processor. The screen can be switched without instructions from the data processor so that communication amount with the data processor is reduced.

In accordance with a further aspect of the present invention, the item selection signal input apparatus includes a variable format display device having a display screen for displaying a selected one of a plurality of screen formats on the display screen; a transparent keyboard panel provided on the display screen having a plurality of manually selectable zone panels, wherein the keyboard panel includes a device responsive to the selection of the zone panel for providing a selection signal indicating the selected zone panel; a memory device for storing screen format data representing a plurality of screen formats; a display controller for controlling the variable format display device in response to the selection signal to select and provide the next screen format on the display screen out of a plurality of screen formats; and an output device responsive to the variable format display device for providing to the data processor a message selected according to the selection signal and the screen format displayed on the display. The output device includes a screen format identification signal memory device for storing and providing a screen format identification signal to identify the selected screen format. The item selection signal input apparatus further includes an output suppress information memory device for storing an output suppress information table prepared keyed to the combination of the value of the selection signal and the screen format identification signal that indicates whether to send the message to the data processor or not, and an output suppress device for searching the output suppress information table in response to the selection signal and the screen format identification signal to derive the output suppress information corresponding to the selection signal and the screen format identification signal, for suppressing the transmission of the message to the data processor by the output device in response to the value of the derived output suppress information.

The item selection signal input apparatus having the above structure has information stored in the output suppress information table for determining whether to transmit the message to the data processor or not according to the selection signal and the screen format displayed at that time. Information indicating the suppress of message transmission may be stored in the output suppress information table regarding process that can be carried out without the aid of the data processor. This will eliminate the need to transmit the message to the data processor by allowing the necessary process to be carried out in the item selection signal input apparatus. Instruction from the data processor is also not required. This will reduce the communication amount between the data processor and the item selection signal input apparatus.

According to a further aspect of the present invention, the item selection signal input apparatus includes a variable format display device having a display screen for displaying a selected one of a plurality of screen formats on the display screen; a transparent keyboard panel provided on the display screen having a plurality of manually selectable zone panels, wherein the keyboard panel includes a device for providing a selection signal indicating the selected zone panel in response to the selection of the zone panel; a memory device for storing the screen format data representing a plurality of screen formats; a display controller for controlling the variable format display device in response to the selection signal to select and provide the next screen format on the display screen out of a plurality of screen formats; an output device responsive to the variable format display device for providing to the data processor a message selected according to the selection signal and the screen format displayed on the display screen; a screen format identification signal memory device for storing and providing the screen format identification signal to identify the selected screen format; an attention attracting signal output device responsive to the selection signal and the screen format identification signal for providing an attention attracting signal that can take at least two values of a first value and a second value; and an attention attracting device responsive to the attention attracting signal taking the second value for attracting the attention of the operator.

According to the item selection signal input apparatus of the above-mentioned structure, an attention attracting signal is provided in response to the selection signal and the screen format identification signal. The attention of the operator is attracted by the attention attracting device when the attention attracting signal takes the second value. No operation is carried out to attract the attention of the operator when the attention attracting signal takes the first value. By providing in advance appropriate information in the attention attracting signal output device, the item selection signal input apparatus can carry out operation to attract the attention of the operator only when a predetermined zone panel is depressed on the relative screen format. This operation does not require instruction from the data processor nor message transmission to the data processor. It is possible to provide an item selection signal input apparatus that can afford agreeable operational environment to the operator while reducing communication amount with the data processor.

According to yet another aspect of the present invention, the item selection signal input apparatus includes a variable format display device having a display screen for displaying a selected one of a plurality of screen formats on the display screen; a transparent keyboard panel provided on the display screen having a plurality of manually selectable zone panels, wherein the keyboard panel includes a device for providing a selection signal indicating the selected zone panel in response to the selection of the zone panel; a memory device for storing screen format data representing a plurality of screen formats; a display controller responsive to a selection signal for controlling the variable format display device to select the next screen formats out of a plurality of screen formats, and displaying the selected next screen format on the display screen; an output device responsive to the selection signal and the variable format display device for providing to a data processor the message selected according to the selection signal and the screen format displayed on the display screen; a specific zone panel select detection device for detecting that the selection signal indicates a specific selection of the zone panels; a screen saving device responsive to the selection of a specific zone panel for saving information to identify the screen format displayed in the variable format display device; a specific function execution device responsive to the selection of a specific zone panel to provide and display data of a specific screen in the variable format display device for executing a predetermined specific process independent of the data process; and a restoring device to detect the termination of a specific process of the specific function execution device for restoring the screen to a state prior to the selection of the specific zone panel according to the information identifying the screen format saved in the screen saving device.

According to the item selection signal input apparatus having the above-mentioned structure, the process independent of the data process can be executed by depressing a specific zone panel and displaying the screen required for the process. The state prior to the selected zone panel is automatically restored when this specific process is completed. There is no interference of the data processor regarding this interruptive process. As a result, an item selection signal input apparatus can be provided that reduces the communication amount with the data processor.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is an item data table.

FIG. 9 is a hard code/output code conversion table.

FIG. 15 is an item data table of the second preferred embodiment.

DESCRIPTION OF THE PREFERRED EMBODIMENTS

Figure 1:
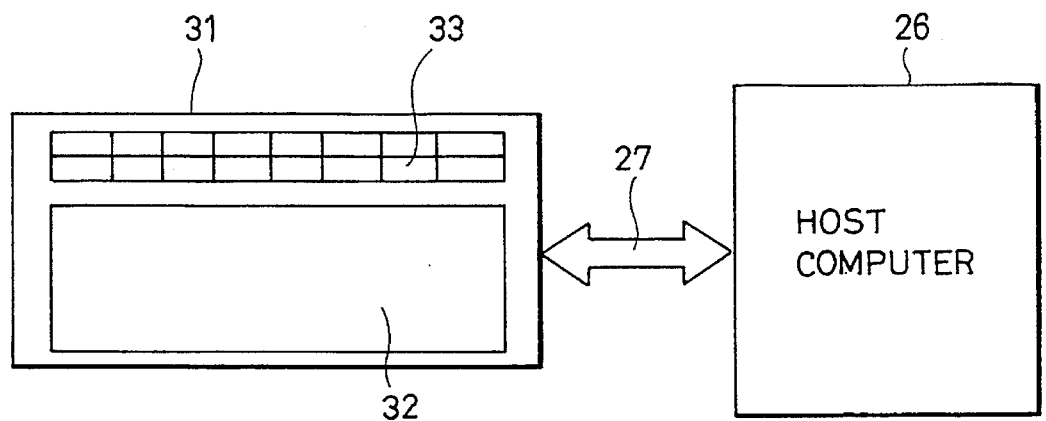
FIG. 1 is a schematic diagram showing a conventional item selection signal input apparatus and a host computer.
Figure 2:
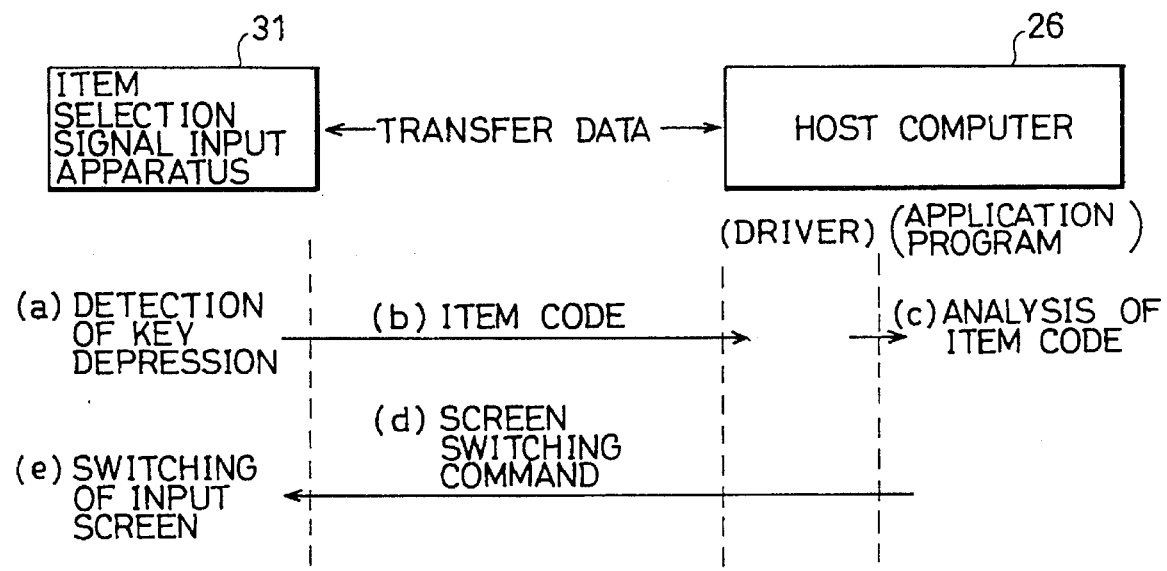
FIG. 2 is a diagram for explaining the sequence of the process carried out between a conventional input selection signal input apparatus and a host computer.
Figure 3:
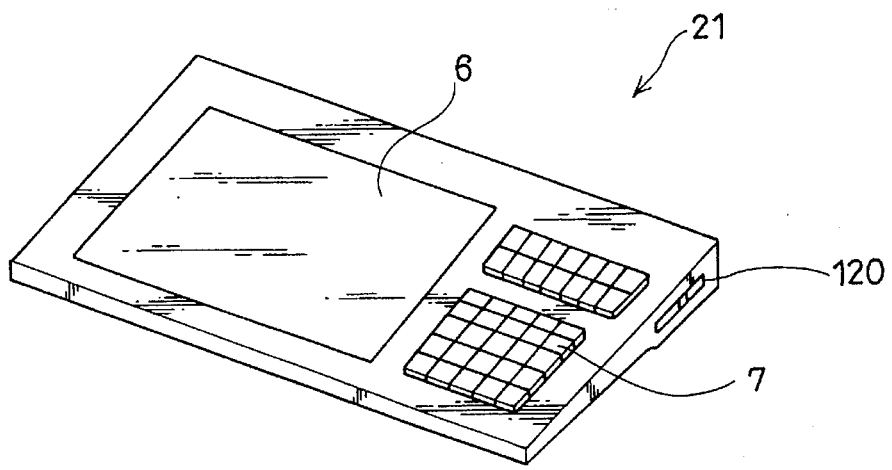
FIG. 3 is an apparance of an item selection signal input apparatus according to a preferred embodiment of the present invention.

Referring to FIG. 3, an item selection signal input apparatus 21 according to a first embodiment of the present invention comprises console keys 7 for entering data of particular types such as numeric value data, a transparent touch panel 6 to select one of a plurality of items for applying a message corresponding to the selected item into the data processor of a host computer and the like, and a socket 120 for IC cards having two a pair of slots where IC cards (not shown in FIG. 3) provided with a RAM (Random Access Memory) backed up by batteries are to be inserted.

Figure 4:
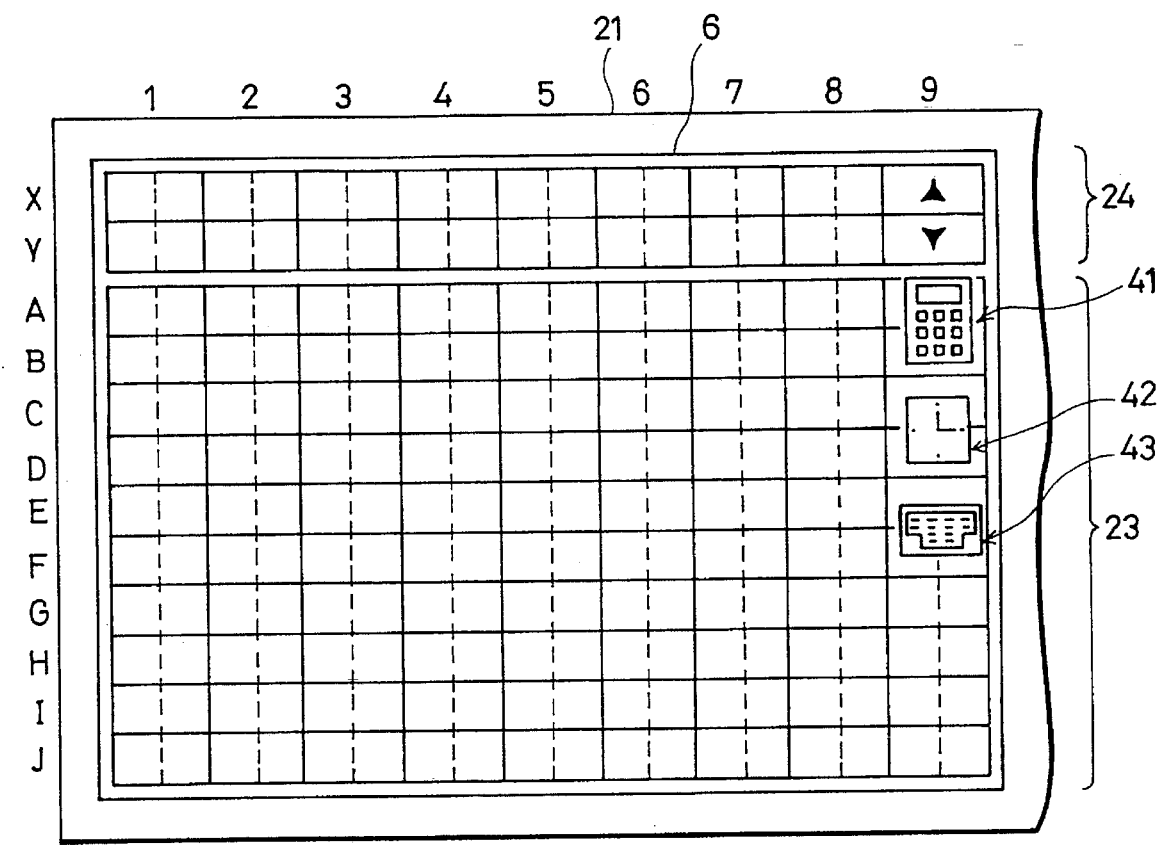
FIGS. 4 and 5 are plan views of a portion of the item selection signal input apparatus of FIG. 3.

Referring to FIG. 4, touch panel 6 comprises an item selection screen 23 including transparent touch keys of 18×10 keys, layered to form a matrix on the front face of the liquid crystal display device each defining a particular zone and a function region 24 including touch keys in a matrix of 18×2 formed in a similar manner.

Figure 5:
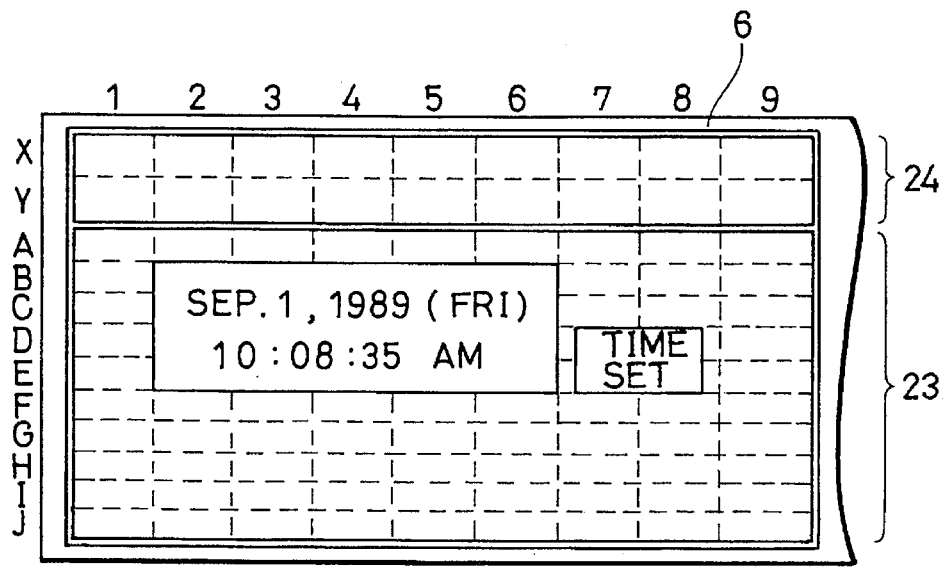

Referring to FIG. 5, arbitrary numbers of various sizes of item keys can be defined by combining the 18×10 keys of item selection screen 23. For example, two keys are defined in FIG. 5. One is a rectangular key having a diagonal line connecting the two points of coordinates (B, 2) and (E, 6). A second is a key named the "time set" key in the figure having the coordinates (D, 7) and (E, 8) as the ends of the diagonal.

It can be appreciated from FIG. 5 that the area of the liquid crystal display device corresponding to each item key has an item name displayed corresponding to that item. The format having this item name displayed can be switched in several ways. It is therefore possible to display various items and select an arbitrary item using touch panel 6 having a limited area and a limited number of keys.

Figure 6:
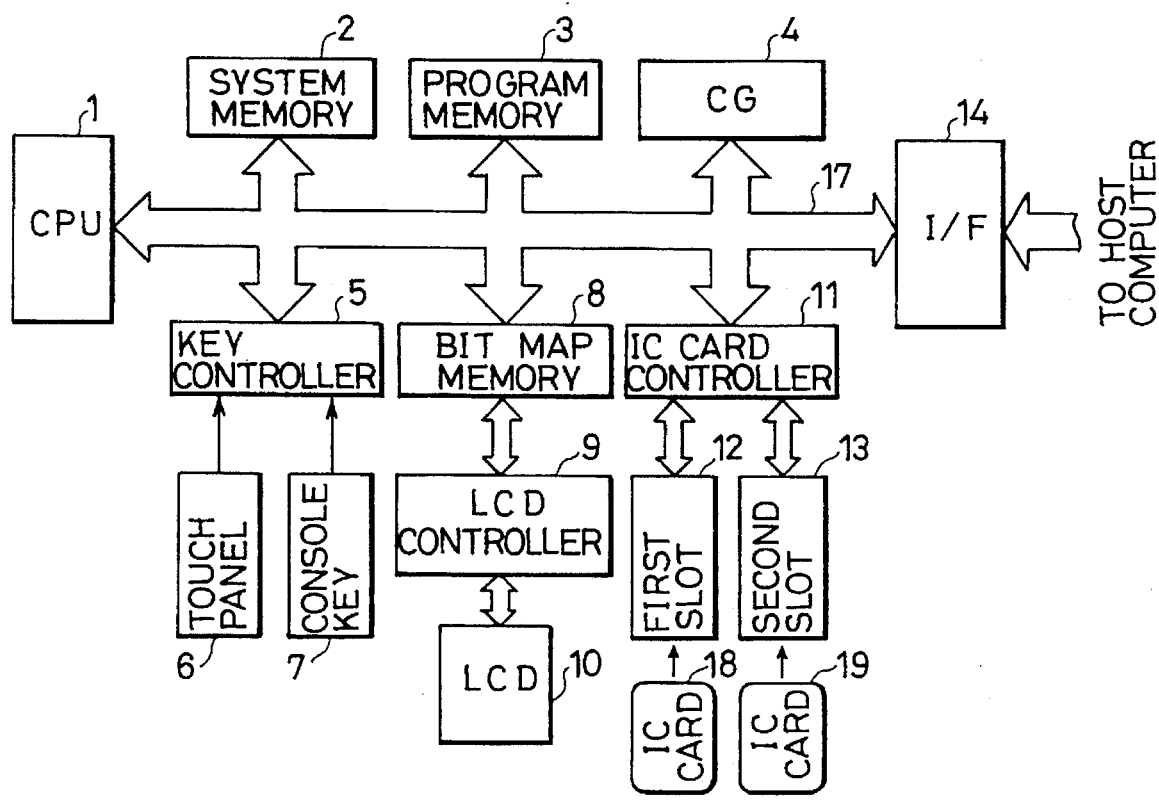
FIG. 6 is a block, diagram of the item selection signal input apparatus of the first preferred embodiment.

Referring to FIG. 6, item selection signal input apparatus 21 comprises a CPU 1 functioning as means for output/display control explained later on, as well as to control each block and carrying out various operation required for entering data to the host computer, a bus 17 connected to CPU 1, a system memory 2 connected to bus 17 for storing display data (the data indicating the format of the keys to be displayed on the liquid crystal display device) and an item data table explained later on, as well as being used as the work area of CPU 1, a program memory 3 connected to bus 17 for storing programs executed by CPU 1, and a character pattern generator (referred to as "CG" hereinafter) 4 connected to bus 17 for generating dot patterns from the display data read out from system memory 2.

Item selection signal input apparatus 21 further comprises a key controller 5 connected to bus 17 for providing to CPU 1 key items selected by touch panel 6 and console keys 7 and signals showing numeric values, a bit map memory 8 connected to bus 17 for storing the dot pattern generated by CG 4, an LCD controller 9 connected to bit map memory 8 for displaying the dot pattern stored in bit map memory 8 on a liquid crystal display device 10, an IC card controller 11 having a first slot 12 and a second slot 13 where IC cards 18 and 19 are to be inserted for reading out display data and item data table from IC cards 18 and 19 inserted in slots 12 and 13 and transferring the same to system memory 2, and for writing out data transferred via bus 17 into IC cards 18 and 19, and an interface circuit (referred to as "I/F" hereinafter) 14 connected to bus 17 for interfacing the item selection signal input apparatus with the host computer.

Figure 7:
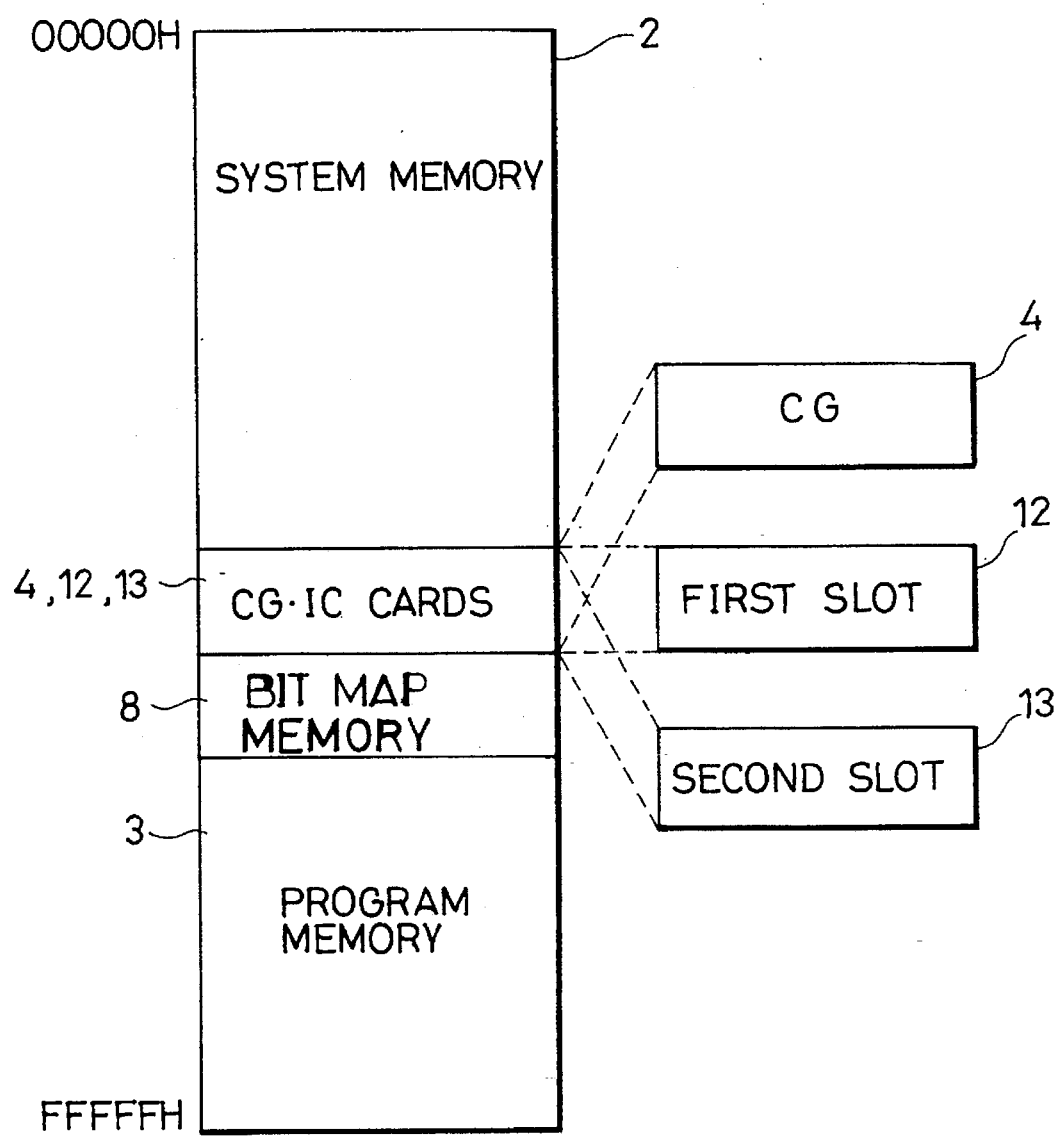
FIG. 7 is a diagram schematically showing a memory map of the item selection signal input apparatus of the first preferred embodiment.

Referring to FIG. 7, the memory map of system memory 2, program memory 3, CG 4, bit map memory 8, first slot 12, and second slot 13 is as follows. System memory 2 starts from address (00000) H. System memory 2 comprises a work memory for storing various data operated by CPU 1, and an area for storing table information such as the item data table explained later on, and the display data that presents the key format displayed on LCD 10.

CG 4, first slot 12, and second slot 13 are allocated with the same address, i.e. the address immediately after system memory 2. CG 4, and slots 12 and 13 are switched alternatively by bank switching. This bank switching is carried out by modifying the value set in a register called the bank register (not shown) within CPU 1. CG 4 functions to generate dot patterns that represent an image out of the display data including the code data read out from system memory 2.

Bit map memory 8 is allocated with the address immediately after CG 4, first slot 12, and second slot 13. Bit map memory 8 stores the picture including the arrangement of various keys displayed by LCD 10.

Program memory 3 is allocated right after bit map memory 8. The tail of program memory 3 is address (FFFFF) H. The program executed by CPU 1 is stored in program memory 3.

Referring to FIG. 6 again, IC cards 18 and 19 store various data required for the operation of item selection signal input apparatus 21, according to the application program executed by the host computer. This data is downloaded from the host computer to IC cards 18 and 19 at the time of system set-up, or when the application program is modified at the host computer. The data stored in IC cards 18 and 19 are transferred to system memory 2 according to the predetermined format on initialization at the time of power up of the item selection signal input apparatus.

Referring to FIG. 8, the item data table required for operation of the item selection signal input apparatus which is stored in IC cards 18 and 19 and transferred to system memory 2 is described hereinafter. This table is partitioned into a plurality of pages each distinguished by the page number. Each page has the data used in a single application stored therein. Each page is segmented into one or a plurality of screen regions distinguished by the screen number.

The size of each screen region is restricted to be within a certain size because the number of keys of touch panel 6 is limited. A plurality of screen regions are provided within one page when the number of keys used in one application becomes too many to be processed in one screen.

Each screen region includes item definition data for defining the combination of the matrix keys of 18×10. The item definition data comprises the item number (output code), the item start position, the size of the item, the whether to switch the screen or not, the code output flag, and the character code to be displayed in the corresponding region of the screen.

The item start position indicates the position of the panel representing one zone on the touch panel corresponding to the start position of the picture of the item key displayed on the screen. The item start position is equivalent to the key position of the touch panel when the size of the item is equal to the smallest zone of the touch panel. When the item spans between a plurality of keys of the touch panel, the item start position shows the topmost and leftmost key position of the keys of the touch panel defining that item.

The size of an item shows the number of keys in the horizontal direction and the vertical direction occupying that item counted from the above-mentioned item start potion on the touch panel.

The item number defines the data to be provided to the host computer (output code or message) when the corresponding key is pressed with the screen being displayed. The screen switching data stores the page number and the screen number to be displayed next on LCD 10 when that item is selected. The code output flag is for the purpose of making determination whether to provide the output code to the host computer or not when that item is selected. When the code output flag is "1", the output code is provided to the host computer. When "0", the output code will not be provided to the host computer.

The display data indicates the characters to be displayed on a predetermined region on LCD 10, defined by the start position and the item size. The screen is not switched when the page number and the screen number in the screen switching data are both 0. Otherwise, the screen indicated by the specified page number and the screen number is displayed on LCD 10.

FIG. 9 is the conversion table of the hard code/output code extracted from the item data table of FIG. 8 for each screen switching. The hard code is the number of the item key displayed on the screen counted from the left top position of the screen. The output code is identical to the item number presented on the item data table of FIG. 8.

The detection of the hard code will be explained hereinafter. Referring to FIG. 6 again, key controller 5 scans the panel partitioned into zones on touch panel 6 in the horizontal and vertical directions starting from the left top point of the screen. CPU 1 checks the key position currently being scanned and the item start position and the item size shown in FIG. 8. When the item turns out to be defined in the item position currently being scanned as the result of the checking, the hard code is incremented by 1. If key position is in the area of the already defined item, the hard code is not incremented and the scanning will be continued. When the entire screen is scanned, a number from 1 in ascending order is allocated to each key starting from the left top point to the right bottom point of the screen. This number is the hard code allocated to that key.

The conversion table of FIG. 9 is prepared to facilitate and speed up the detection of the output code from the applied hard code.

Figure 10:
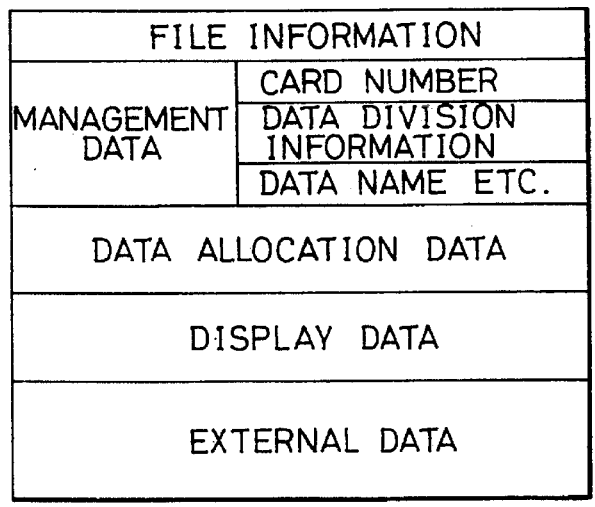
FIG. 10 is a data format of an IC card.

Referring to FIG. 10, data stored in IC cards 18 and 19 have the following format. The data comprise file information, management data, item allocation data, the display data, and external character data stored in this order from the beginning.

File information is for indicating whether the data necessary for operation of the item selection signal input apparatus is stored in the IC card or not. By examining this information, it is possible to make determination whether the IC card can be used for the item selection signal input apparatus or a new data can be written into the IC card.

The management data comprises the card number, the data division information, data name, etc. The card number is for identifying this IC card. The data division information indicates whether one set of data required for the operation of the item selection signal input apparatus is divided into two or more IC cards. The data name indicates the contents of the data stored in the IC card. The management data also includes information regarding the creation date of the data.

The item allocation data is the data excluding the display data of the data in the item data table of FIG. 8. The display data is indicated as the display data in FIG. 8. The external data is the information regarding external characters that are provided in addition to the standard provided characters. The external character data comprises the number of characters used within that IC card, and data representing the dot pattern allocated to that external character.

Referring to FIGS. 3–10, the item selection signal input apparatus according to the embodiment of the present invention operates as in the following manner. With particular reference to FIG. 6, data is written into IC cards 18 and 19 as below. Through I/F 14, data required for the operation of the item selection signal input apparatus adaptable to the application program executed in the host computer is provided from the host computer to an IC card controller 11. IC card controller 11 writes this data into IC cards 18 and 19 via first and second slots 12 and 13, respectively. Data is written into IC cards 18 and 19 when the application program in the host computer is modified, or at the time of system power-up.

Once the data required for operation is written into IC cards 18 and 19, the item selection signal input apparatus operates in the following manner. First initialization is carried out by the program executed by CPU 1 at the time of power-up of the item selection signal input apparatus. When IC card 18 is inserted in the first slot 12, the data having the format as shown in FIG. 10 that is stored in IC card 18 is written into system memory 2 via IC card controller 11 in the form of the item data table of FIG. 8. The display data stored in IC card 18 is written into CG 4 via IC card controller 11. External character data is also written into CG 4 if necessary at this time.

Either the first slot 12 or the second slot 13 can be selected by the aforementioned bank switching for this data transfer. Also, data can be read out in sequence from the IC card having the lower card number and establish data in system memory 2 and CG 4, by examining the management data of FIG. 10. CPU 1 can identify whether data is divided and stored in other IC cards by checking the data division information. When data is divided and stored in other cards, CPU 1 carries out bank switching to read out data stored in other IC cards in other slots and stores the same in system memory 2 and CG 4.

CPU 1 stores a first predetermined screen in bit map memory 8 referring to the item data table stored in system memory 2 and the display data stored in CG 4. LCD controller 9 reads the data stored in bit map memory 8 to drive LCD 10 to display the first screen on LCD 10. The first screen displays various keys. At this time, CPU 1 generates a hard code/output code conversion table as shown in FIG. 9 for this first screen from the item data table, and stores the same in system memory 2.

The operator presses touch panel 6 over the key of the picture from the keys displayed on LCD 10 corresponding to the application which he/she is about to carry out. Because key controller 5 scans each key on touch panel 6, a signal indicating the location of the pressed key is applied to CPU 1 when the depression of a key is detected.

CPU 1 obtains the hard code allocated to the key selected by the operator according to the signal applied from key controller 5 by examining item data table 8. CPU 1 determines the output code from the hard code according to the conversion table. When the code output flag of FIG. 8 is "1", CPU 1 provides the output code to the host computer via I/F 14. When the code output flag is "0", CPU 1 does not provide data to the host computer.

The item number (output code) is obtained in the above-mentioned manner by the key selected by the operator. CPU 1 obtains the screen switching data corresponding to the item selected by the operator from the item data table. As mentioned above, CPU 1 does not carry out screen switching when the page number and the screen number of the screen switching data are both 0. In cases where the page number is not 0, CPU 1 reads out from the item data table the data defined by the corresponding page number and the screen number. CPU 1 provides the read out data to CG 4. CG 4 generates dot patterns from the data provided from CPU 1 to write the same into bit map memory 8. LCD controller 9 reads out the data written in bit map memory 8 to display the same on the corresponding screen on LCD 10.

At this time, CPU 1 generates a hard code/output code conversion table (FIG. 9) corresponding to the displayed screen from the item data table and stores the same in system memory 2 similarly to the aforementioned manner.

The above operation is repeated in response to the operator pressing touch panel 6.

Thus, the item selection signal input apparatus according to the present invention can select and display a suitable screen in response to the operation of the operator without instructions from the host computer, due to the fact that an item data table is stored in advance in system memory 2. At the next processing procedure necessary data is transferred to system memory 2 if IC card 18 is inserted in slot 12, by once down-loading data from the host computer to an IC card. There is no need to down-load again data required for the operation of the item selection signal input apparatus from the host computer. The communication amount between the host computer and the item selection signal input apparatus is reduced significantly compared with a conventional apparatus. More capacity of the host computer can be devoted to the principal operation function.

It is appreciated from FIG. 8 that a field named code output flag is provided in the item data table. When "0" is written in this field, data will not be transmitted from the item selection signal input apparatus to the host computer even when the operator selects the corresponding item. The item selection signal input apparatus can therefore carry out automatically screen switching without the aid of the host computer. The amount of data transfer between the item selection signal input apparatus and the host computer is reduced compared with conventional apparatus.

The provision of the above-mentioned code output flag field eliminates the need to press a key for page switching. The page switching key may be implemented using a normal key format display screen. Accordingly, the item selection signal input apparatus of the present invention is applicable to objects of wider ranges and to various applications.

Figure 11:
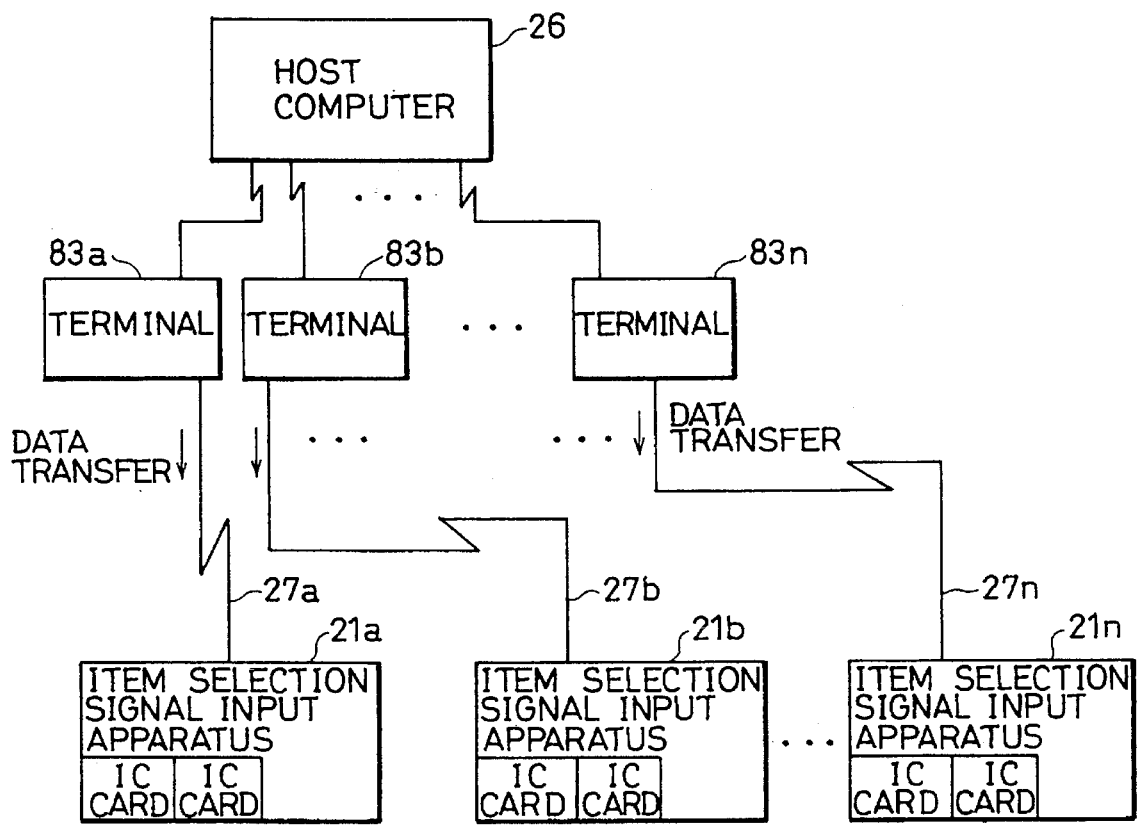
FIG. 11 is a diagram schematically showing the network of a host computer and a plurality of item selection signal input apparatus.

Referring to FIG. 11, a plurality of item selection signal input apparatus 21a–21n are connected to host computer 26 via terminals 83a–83n and transmission paths 27a–27n, respectively. Each of item selection signal input apparatus 21a–21n is provided with two IC card slots.

As mentioned before, data required for the operation of each of item selection signal input apparatus 21a–21n is down-loaded to the IC cards of each of item selection signal input apparatus 21a–21n from host computer 26, at the time of system installation, or at the time of modification of the application program of host computer 26. Once data is down-loaded to the IC cards, it is not required to transfer data from host computer 26 to each of item selection signal input apparatus 21a–21n until the application program of host computer 26 is modified. This will reduce the load of host computer 26.

The provision of two IC card slots in each of item selection signal input apparatus 21a–21n will allow the usage of an item selection signal input apparatus that will be described hereinafter. At the time of system power-up or at the time of modification of the application program, data required for the operation of the item selection signal input apparatus is down-loaded from host computer 26 to the IC card of only one item selection signal input apparatus 21a. This item selection signal input apparatus 21a copies the data down-loaded from host computer 26 and written into the IC card inserted in the first slot into the IC card inserted in the second slot. There is no reception/transmission of messages between host computer 26 and item selection signal input apparatus 21a at this time. This copy is carried out by pressing a copy mode key provided in console key 7 (refer to FIG. 3). This operation causes data written in the IC card inserted in the first slot to be directly copied to the IC card inserted in the second slot.

The operator takes out the IC card from the second slot and inserts this IC card to the first slot of a second item selection signal input apparatus 21b, for example. By using the data stored in the IC card inserted in the first slot, item selection signal input apparatus 21b can carry out operation identical to that of item selection signal input apparatus 21a.

There is no message transmission/reception between item selection signal input apparatus 21b and host computer 26 in this case. That is to say, if data is down-loaded from host computer 26 to at least one item selection signal input apparatus, the necessary data can be transplanted to other item selection signal input apparatus via the IC card. This means that the down-load of data from host computer 26 to each of item selection signal input apparatus may be omitted. This will allow the capacity of host computer 26 to be devoted to the principal operation processing function.

Figure 12:
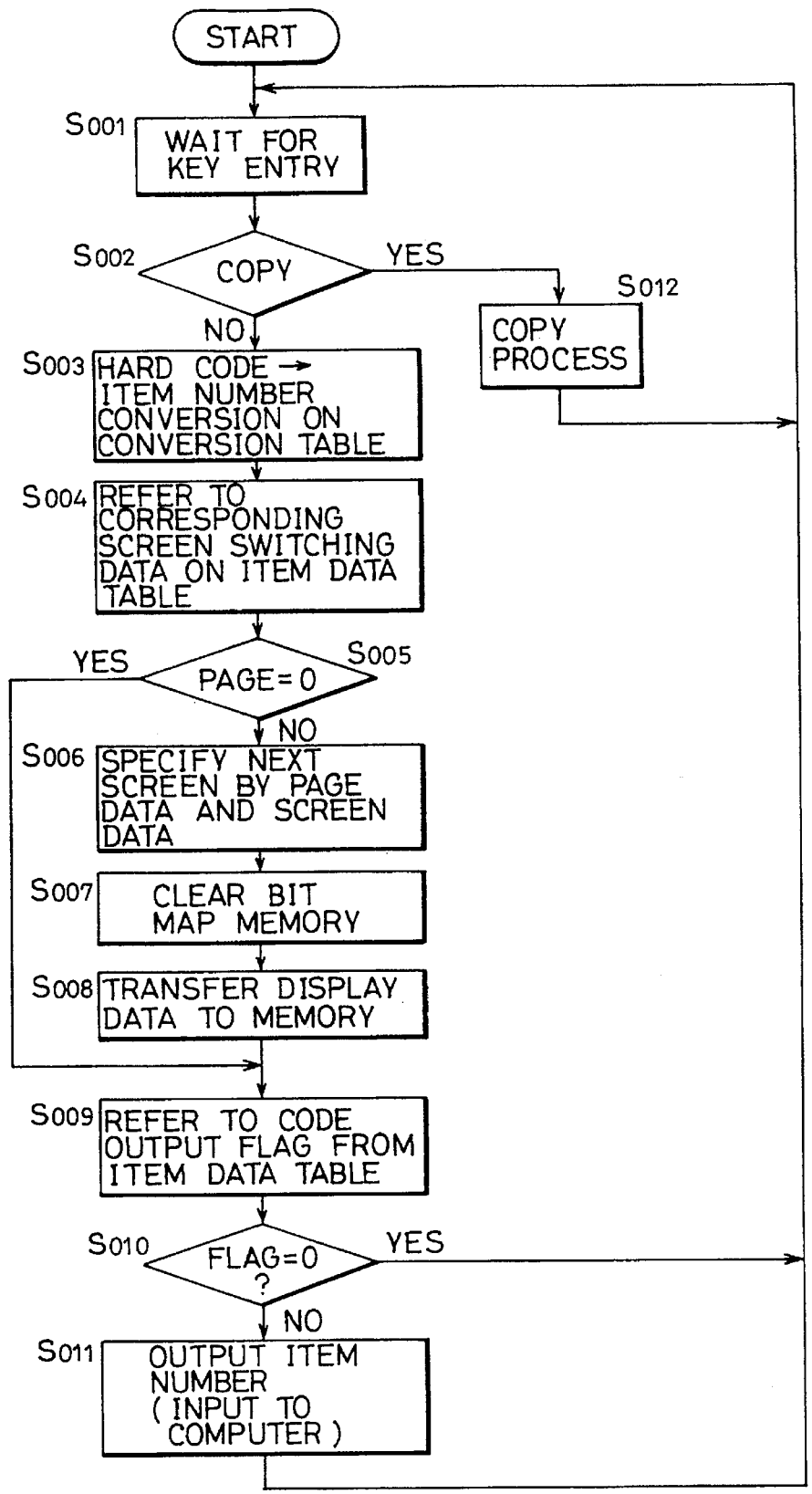
FIGS. 12 and 13 are flow charts of the program executed in the item selection signal input apparatus of the first preferred embodiment of the present invention.
Figure 13:
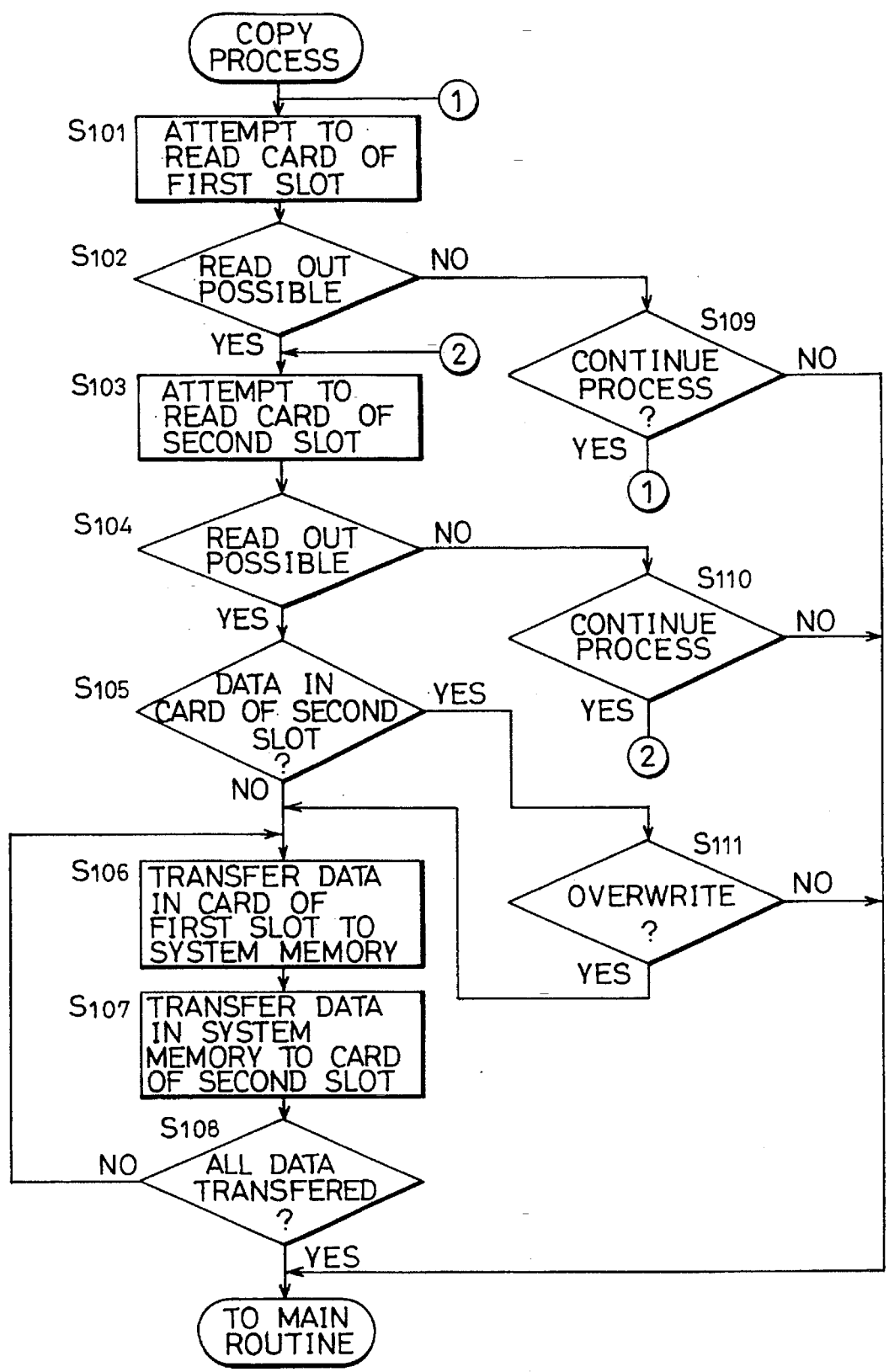

Referring to FIGS. 12 and 13, the program executed in CPU 1 of the item selection signal input apparatus of the present invention has the following control structure. At step S001, program waits for key entry. When a touch key is pressed, control proceeds to step S002.

At step S002, determination is made whether the pressed key is the key instructing the execution of the copy mode. If the result of the determination is YES, control proceeds to step S012, otherwise control proceeds to step S003. The process carried out in step S012 will be explained later on with reference to FIG. 13.

At step S003, the hard code is converted into an output code by referring to the conversion table of FIG. 9. The control proceeds to step S004.

At step S004, the screen switching data of the item corresponding to the item number obtained at step S003 is referenced from the item data table of FIG. 8. The control proceeds to step S005.

At step S005, determination is made whether the page number of the screen switching data is "0" or not. If the result of the determination is YES, control proceeds to step S009, otherwise control proceeds to step S006.

At step S006, the screen format to be displayed next is determined from the page number and the screen number of the screen switching data. The control proceeds to step S007.

At step S007, bit map memory 8 shown in FIGS. 6 and 7 is cleared. The control proceeds to step S008.

At step S008, data to be displayed on the screen is converted into dot patterns by CG 4 and transferred to bit map memory 8. The control proceeds to step S009.

At step S009, the code output flag of the item having the corresponding item number is referenced. The control proceeds to S010.

At step S010, determination is made whether the obtained code output flag is "0" or not. If the result of the determination is YES, control returns to step S001 because this output code indicates not to provide data to the host computer, as mentioned before. Otherwise, control proceeds to step S011.

At step S011, the obtained item number is provided to the host computer. The control then returns to step S001.

Referring to FIG. 13, the copy process is carried out in the following manner. At step S101, an attempt is made to read the IC card inserted in the first slot. Then the control proceeds to step S102. At step S102, determination is made as to whether data can be read out from the IC card in the first slot. If the result of the determination is YES, control proceeds to step S103, otherwise control proceeds to step S109.

At step S109, determination is made whether the process is to be continued or not. This determination is carried out by displaying a message on LCD 10 (FIG. 6) which prompts the selection of whether to continue the process or not and by receiving the key entry of the operator. If the process is to be continued, control is returned to step S101, otherwise control is returned to the main routine.

If the determination result at step S102 is YES, control proceeds to step S103 to attempt the reading of the IC card inserted in the second slot. The control proceeds to step S104.

At step S104, determination is made as to whether it is possible to read the IC card in the second slot. If the result of the determination is YES, control proceeds to step S105, otherwise control proceeds to step S110.

At step S110, determination is made similarly to that of step S109 as to whether to continue the process or not. If the process is to be continued, control returns to step S103, otherwise control returns to the main routine.

In case control proceeds to step S105, determination is made as to whether there is data in the IC card inserted in the second slot. This determination is carried out by referring to the file information of FIG. 10. If the answer to the determination is YES, control proceeds to step S111, otherwise control proceeds to step S106.

At step S111, determination is made whether to overwrite the data already stored in the IC card inserted in the second slot with the data stored in the IC card in the first slot. This determination is carried out with the intervention of the operator by displaying a message on LCD 10, similar to those of steps S109 and S110. If the answer to the determination is NO, the control returns to the main routine, otherwise to step S106.

At step S106, the data stored in the IC card inserted in the first slot is transferred to the system memory. The control proceeds to step S107.

At step S107, the data stored in the system memory is transferred to the IC card inserted in the second slot. The data is written into the IC card of the second slot. The control then proceeds to S108.

At step S108, determination is made as to whether all the data stored in the IC card inserted in the first slot is transferred to the IC card inserted in the second slot. If the answer to this determination is NO, control proceeds to step S106, and otherwise, the control returns to the main routine.

By executing the program having the above-mentioned structure in CPU 1, data transmission between the item selection signal input apparatus and the host computer can be reduced significantly compared with that of conventional apparatus. There is no need to receive data down-load from the host computer again at the time of power-up of the item selection signal input apparatus if the necessary data has been already transferred to the IC card. It is possible to copy the data down-loaded to an IC card from the host computer in one item selection signal input apparatus to another IC card without the assistance of the host computer. By distributing this IC card to other item selection signal input apparatus, these other item selection signal input apparatus do not have to receive the data down-load from the host computer. In accordance with the present invention, communication amount between the item selection signal input apparatus and the host computer is reduced compared with that of conventional apparatus.

Figure 14:
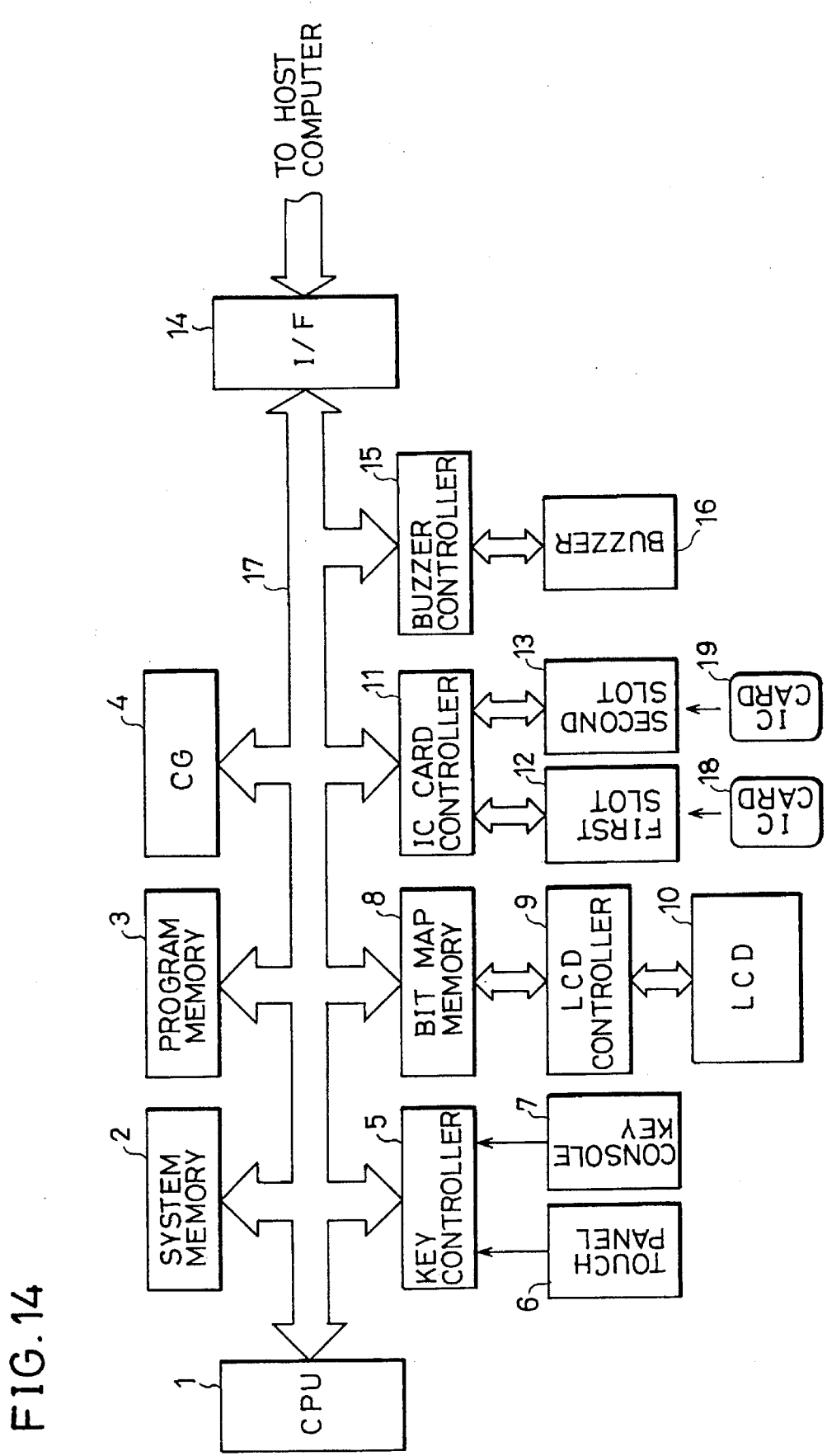
FIG. 14 is a block diagram of an item selection signal input apparatus of a second preferred embodiment of the present invention.

A second preferred embodiment will be explained hereinafter having other features additional to the above-mentioned first preferred embodiment of the present invention. Referring to FIG. 14, the second preferred embodiment of the item selection signal input apparatus is different from the first preferred embodiment of the item selection signal input apparatus of FIG. 6 in that the former includes a buzzer controller 15 connected to bus 17 for sounding a buzzer 16 according to an instruction from CPU 1, new items in the item data table stored in system memory 2, and a routine provided in the program executed by CPU 1 for interruptive process that can be carried out only in the item selection signal input apparatus independently of the host computer. The same components have the same reference numbers and the same names denoted in FIGS. 6 and 14. The features thereof are also identical. Therefore, the detailed description thereof will not be repeated here.

Referring to FIG. 4 again, the rightmost column of item selection screen 23 of touch panel 6 is provided with interrupt keys 41–43 from the top in order. Each of these interrupt keys 41–43 is identified by the icon displayed on LCD 10.

Interrupt key 41 is provided to call the process executing the function of this item selection signal input apparatus 21 as a calculator. Interrupt key 42 is provided to display a clock on LCD 10. Interrupt key 43 is provided to call the program functioning item selection signal input apparatus 21 as a full keyboard.

The item data table of FIG. 15 stored in system memory 2 of the item selection signal input apparatus of the present embodiment differs from the table shown in FIG. 8 in that a buzzer control code for controlling the bleep of buzzer 16 and a character brightness reversion flag for indicating whether to temporarily reverse the relative brightness of the picture of the corresponding key on LCD 10 when touch panel 6 is pressed by the operator are provided in addition to the items of the table of FIG. 8. The character brightness reversion flag is for indicating the picture of the item to be displayed in the normal state or the brightness reversed state on LCD 10.

Buzzer 16 is not sounded when the buzzer control code is "0". When the buzzer control code is "1", buzzer 16 will bleep at a predetermined sound level. When the buzzer control code is "2", buzzer 16 will bleep at a higher sound level.

When the display control flag is "0", the relative brightness of the picture of the corresponding item is not reversed even if the operator presses touch panel 6. When the display control flag is "1", the relative brightness of the picture of the key on LCD 10 corresponding to the key on the touch panel pressed by the operator is reversed.

Figures 16, 17:
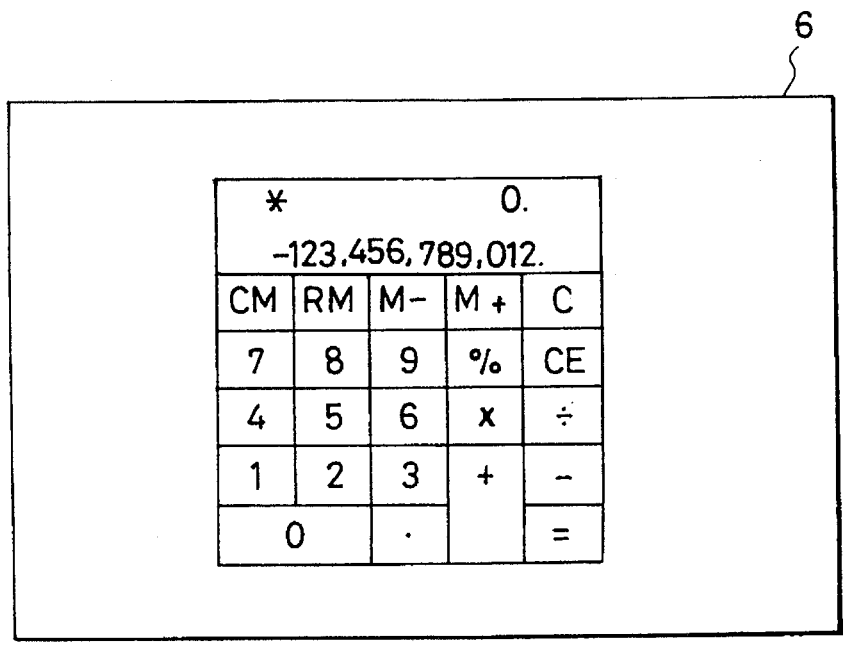
FIG. 16 is a hard code/output code conversion table of the second preferred embodiment.
FIG. 17 is a diagram schematically showing the screen displayed in a specific process executed as an interruptive process in the item selection signal input apparatus.

FIG. 16 is a hard code/output code conversion table generated by CPU 1 from the item data table of FIG. 15. This table differs from the table of the first preferred embodiment shown in FIG. 9 in that the output codes include "−1", "−2", and "−3". Output codes "−1", "−2", and "−3" indicate that interrupt key 41 (hard code "03"), interrupt key 42 (hard code "06"), and interrupt key 43 (hard code "07") respectively are pressed by the operator. The item selection signal input apparatus detects the corresponding hard code when the operator presses touch panel 6 to convert that hard code into an output code according to the conversion table of FIG. 16. The item selection signal input apparatus carries out normal process when the obtained output code is positive, and carries out interruptive process solely by the item selection signal input apparatus independent of the host computer when the output code is negative.

Referring to FIG. 17, a picture of a calculator model is displayed on touch panel 6 when interrupt key 41 of FIG. 4 is pressed. Each key of the displayed calculator is allocated with one or a plurality of keys of the touch panel. By pressing the picture of a key of the calculator on touch panel 6, an operation similar to that when the keys of a calculator is actually pressed will be carried out in the item selection signal input apparatus, whereby the result will be displayed on touch panel 6.

Referring to FIGS. 4 and 14–17, the item selection signal input apparatus of the second embodiment operates in a manner described hereinafter. The down-load process of data from the host computer to IC cards 18 and 19 are carried out in the present embodiment in a manner similar to that of the first embodiment. The detailed description thereof, therefore, will not be repeated here.

The operation of the item selection signal input apparatus will be described when IC card 18 having the data required for the operation of the item selection signal input apparatus written therein is inserted in the first slot 12. On powering up the item selection signal input apparatus, the data written in IC cards 18 and 19 are written into system memory 2 via IC card controller 11 in the format shown in FIG. 15. CPU 1 reads out the data of the screen to be initially displayed from system memory 2 to CG 4. CG 4 converts the applied data into a bit map and writes the same into bit map memory 8. The determination of the key item to be displayed in normal mode or in brightness reversion mode is carried out for each item according to the value of the "character brightness reversion flag" of the item data table of FIG. 15. CPU 1 reads out the data regarding the screen to be initially displayed from the item data table to generate a hard code/output code conversion table of FIG. 16 similarly to that of the first embodiment, and provides the same to system memory 2.

The operator will press touch panel 6 of the region where the desired key is displayed according to the key format displayed on LCD 10. Key controller 5 scans each key of touch panel 6, as mentioned before, to provide the hard code indicating the pressed key to CPU 1 on encountering the pressed key. CPU 1 carries out conversion of the hard code into the output code according to the conversion table of FIG. 16. CPU 1 searches the table of FIG. 15 according to the page number of the display screen, the screen number and the converted output code to derive each field value of the corresponding output code (item number).

CPU 1 provides a soft code to the host computer when the value of the obtained output flag is not "0". If the output flag is "0", CPU 1 does not provide the item number to the host computer.

CPU 1 does not sound buzzer 16 when the buzzer control code is "0". When the buzzer control code is "1", CPU 1 controls buzzer controller 15 to bleep a low sound level with buzzer 16. When the buzzer control code is "2", CPU 1 controls buzzer controller 15 to bleep a high sound level with buzzer 16.

When the display control flag is "0", CPU 1 does not change the display of the picture of the key representing the selected item. When the display control flag is "1", CPU 1 controls CG 4 to rewrite a portion of the picture data written in bit map memory 8 and temporarily reverses the relative brightness of the key picture corresponding to the selected item.

CPU 1 does not change the displayed screen when the page number and the screen number of the obtained screen switching data are both 0. Otherwise, CPU 1 derives the data defined by the page number and the screen number from the item data table stored in system memory 2. CPU 1 provides the display data in the item data table to CG 4. According to the applied data, CG 4 generates a dot pattern and writes the same into bit map memory 8. LCD controller 9 reads out the new picture data written in bit map memory 8 to display the same on LCD 10. At this time, CPU 1 generates a hard code/output code conversion table of FIG. 16 regarding the new displayed screen and stores the same in system memory 2.

Assume that the key selected by the operator is the special key 41 shown in FIG. 4. The item selection signal input apparatus operates as below. Key controller 5 is responsive to the depression of the special key 41 to provide a hard code of "03", for example, to CPU 1. CPU 1 refers to the hard code/output code conversion table to obtain an output code "−1" corresponding to hard code "03". CPU 1 is responsive to the negative value of this output code to enter an interruptive process described below for executing a program specified by this value. It is assumed that this program is written into program memory 3 in advance.

On detecting "−1" of the output code, CPU 1 stores the page number and the screen number of the displayed screen into a particular region in system memory 2. CPU 1 then reads out from program memory 3 the program for operating the item selection signal input apparatus as a calculator and the screen data required for that program (shown in FIG. 17), and transfers the same to system memory 2. CPU 1 provides the screen data to CG 4. CG 4 generates a dot pattern showing a picture such as that shown in FIG. 17 according to the applied screen data, and provides the same to bit map memory 8. LCD controller 9 reads out the data newly written into bit map memory 8 and displays the same on LCD 10. The calculator screen of FIG. 17 is displayed on LCD 10.

As stated before, each key picture of the calculator screen of FIG. 17 is allocated with one or a plurality of touch keys of touch panel 6. The depression of the portion of the desired key picture on touch panel 6 by the operator causes the hard key indicating that touch key to be provided to CPU 1 from key controller 5. CPU 1 analyzes the obtained hard code according to the calculator program to carry out the necessary operation, and obtains the result. If it is necessary to change the display according to this result, CPU 1 provides the data indicating the changed screen to CG 4. CG 4 newly generates a dot pattern according to the applied data and writes the same to bit map memory 8. The data written in bit map memory 8 is displayed on LCD 10 by LCD controller 9.

It is possible to operate the item selection signal input apparatus in a manner as if the operator is actually using a calculator, with the operator pressing the keys on the calculator screen of FIG. 17. This operation as an calculator is carried out only by the program stored in advance in program memory 3 and transferred to system memory 2. CPU 1 does not have to transmit/receive messages to or from the host computer. Thus, an embodiment that allows various operations for the operator can be provided without increasing the load of the host computer.

The program of displaying a clock and the program of operating the item selection signal input apparatus as a full keyboard on pressing the special keys 42 and 43 of FIG. 4, respectively, are carried out by CPU 1 similarly to the calculator program. These programs are carried out by CPU 1 independent of the host computer. There is no need to use the capacity of the host computer for interruptive process, as in conventional apparatus, and the possibility of applying wasteful load to the host computer is eliminated.

The above-mentioned special programs can be terminated by pressing a specific key on the touch panel. For example, the special keys 41, 42, and 43 on the touch panel are displayed at normal times, and also during the execution of the interruptive programs. It is possible to create a calculator program that ends on pressing special key 41 again.

When the key is pressed to terminate the calculator program, CPU 1 reads out the page number and the screen number of the screen displayed before pressing special key 41 stored in system memory 2. CPU 1 provides the display data of the screen corresponding to the item data table according to the read out page number and the screen number to CG 4. CG 4 generates a dot pattern according to the applied data to write the same into bit map memory 8. The picture written into bit map memory 8 is displayed on LCD 10 by LCD controller 9. The displayed screen is the screen displayed before special key 41 is pressed. The operator can therefore return to the process before the interruptive process.

Figure 18:
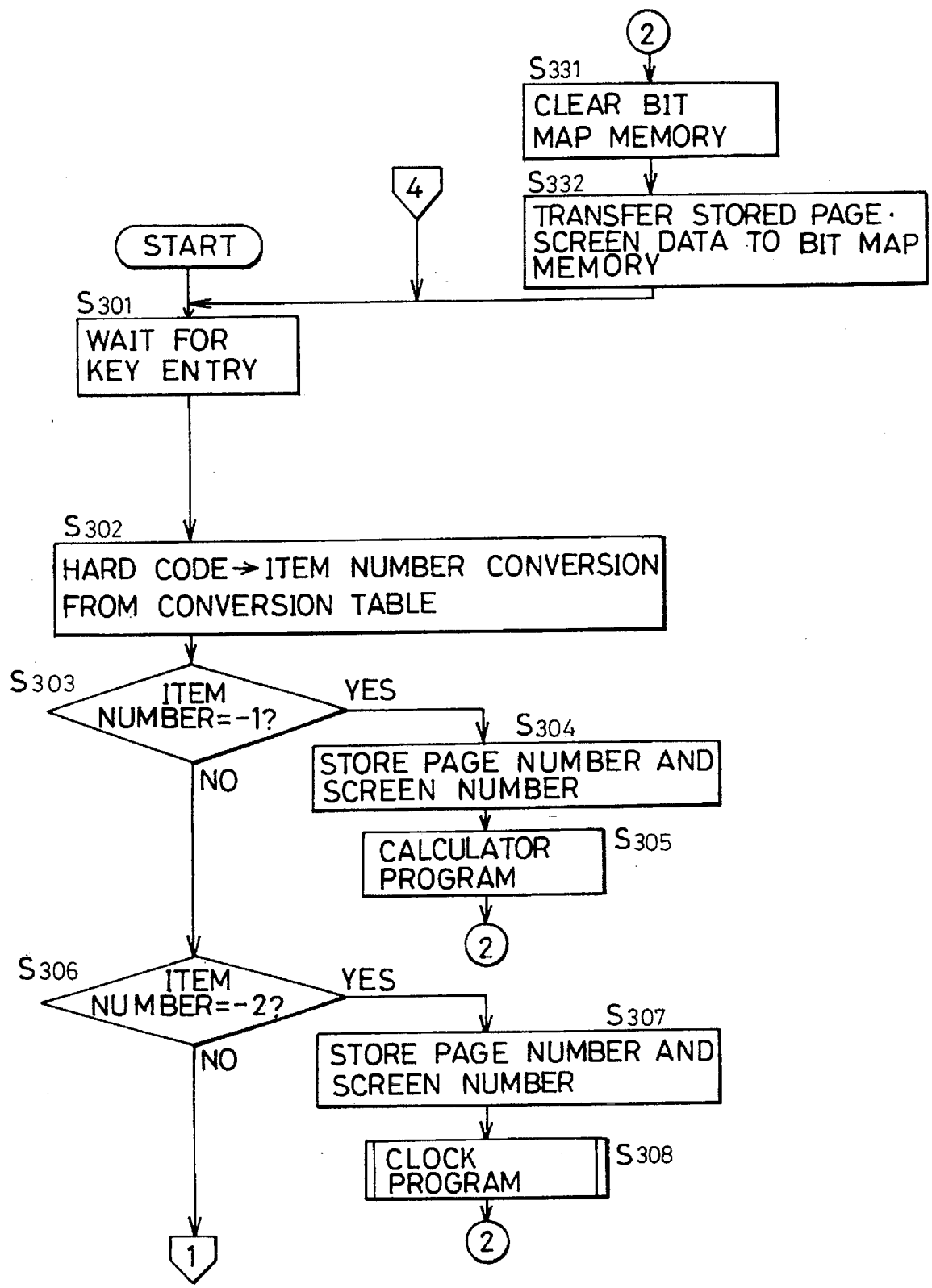
FIGS. 18–20 are flow charts of the program executed in the item selection signal input apparatus of the second preferred embodiment.
Figure 19:
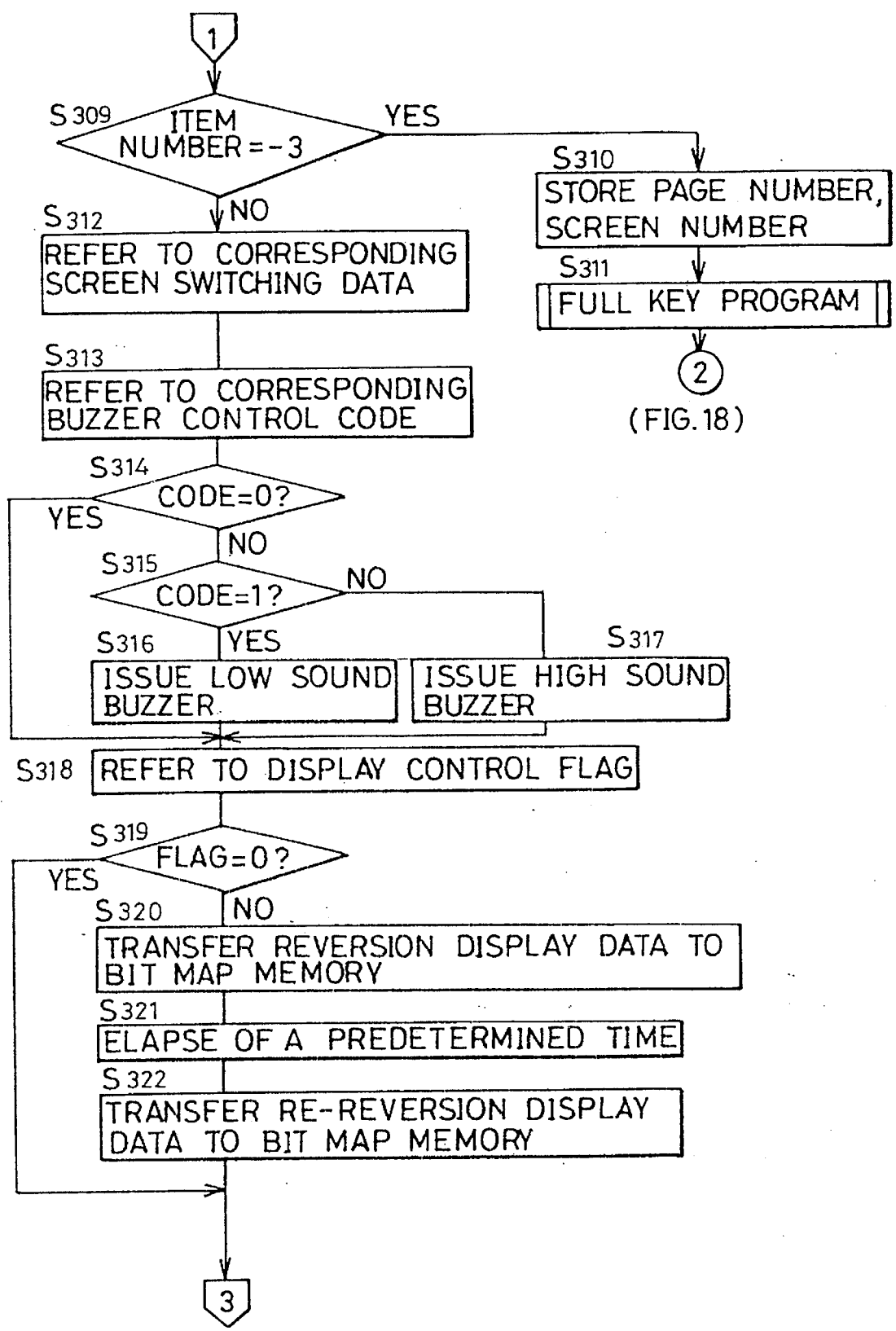
Figure 20:
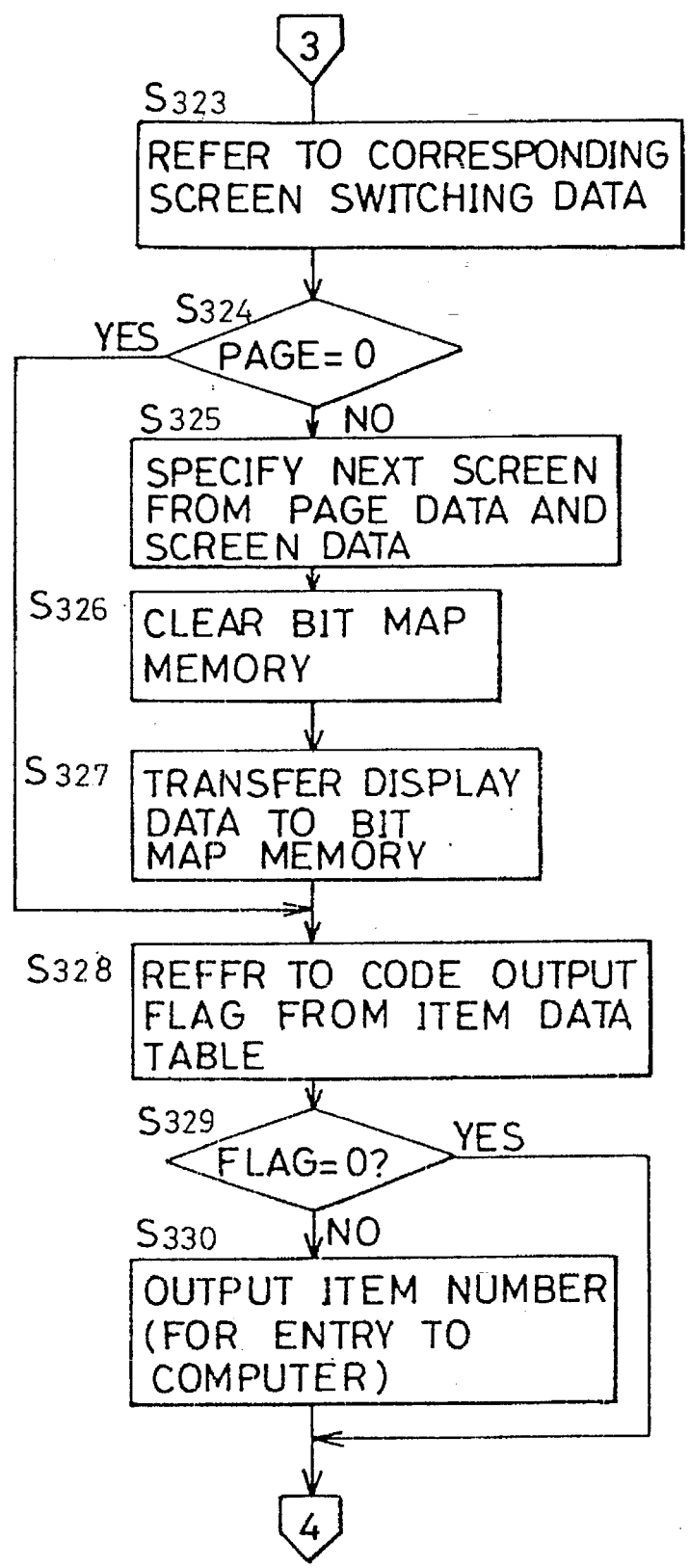

FIGS. 18–20 are flow charts of the programs executed in CPU 1 of the item selection signal input apparatus of the second embodiment. Referring to FIGS. 18–20, CPU 1 waits for the key selection by the operator at step S301. In response to a signal applied to CPU 1 from key controller 5 indicating a selection of a key by the operator, the control proceeds to step S302.

At step S302, CPU 1 converts the hard code provided from key controller 5 into an output code (item number) using the conversion table shown in FIG. 16. The control proceeds to step S303.

At step S303, determination is made as to whether the obtained item number is −1 or not. If the answer to the determination is YES, the control proceeds to step S304, otherwise to step S306.

At step S304, the page number and the screen number of the screen currently displayed is stored in system memory 2. The control proceeds to step S305.

At step S305, the calculator program stored in system memory 2 is executed by CPU 1. When the execution of the calculator program has ended, the control proceeds to step S331.

At step S331, the data written in bit map memory 8 is cleared. The control then proceeds to step S332.

At step S332, the page number and the screen number stored in system memory 2 are read out, and the data indicating the corresponding screen is read out from the item data table (FIG. 15), and the same is transferred to bit map memory 8 via CG 4. The control then proceeds to step S301.

When the control proceeds to step S306 from step S303, determination is made as to whether the item number is −2 or not at step S306. If the answer to the determination is YES, control proceeds to step S307, otherwise to step S309.

At step S307, the page number and the screen number of the currently displayed screen are stored in system memory 2. The control then proceeds to step S308.

At step S308, the clock program transferred to system memory 2 from program memory 3 is executed. When this execution of the clock program ends, the control proceeds to step S331.

If the control proceeds to step S309 according to the result of the determination at step S306, determination is made whether the item number is equal to −3 or not at step S309. If the answer to the determination is YES, control proceeds to step S310, otherwise to step S312.

At step S310, the page number and the screen number of the currently displayed screen are stored in system memory 2. The control then proceeds to step S311.

At step S311, the program transferred from program memory 3 to system memory 2 for realizing the function as a full keyboard is executed. When the execution of this program ends, the control proceeds to step S331.

If the control proceeds to step S312 from step S309, the screen switching data corresponding to the obtained item number is read out from the item data table at step S312. Then the control proceeds to step S313.

At step S313, the buzzer control code corresponding to the obtained item number is read out. The control proceeds to step S314.

At step S314, determination is made whether the buzzer control code is 0 or not. If the answer to the determination is YES, control proceeds to step S318, otherwise to step S315.

At step S315, determination is made whether the buzzer control code is equal to 1 or not. If the result of determination is YES, control proceeds to step S316, otherwise to step S317.

At step S316, CPU 1 controls buzzer controller 15 to issue a low sound of buzzer 16. At step S317, CPU 1 controls buzzer controller 15 to issue a high sound with buzzer 16. Control proceeds to step S318 from either of steps S316 and S317.

At step S318, the display control flag corresponding to the obtained item number is read out from the item data table. The control then proceeds to step S319.

At step S319, determination is made whether the display control flag is equal to 0 or not. If the answer to the determination is YES, control proceeds to step S323, otherwise to step S320.

At step S320, the picture data having the relative brightness of the key picture corresponding to the selected key reversed is transferred to bit map memory 8. The control proceeds to step S321.

At step S321, there is an elapse of a predetermined time period to ensure the visual confirmation by the operator. The control proceeds to step S322 after the elapse of a predetermined time period.

At step S322, the relative brightness of the picture corresponding to the selected item is reversed again to return to the normal display. Then the control proceeds to step S323.

At step S323, the screen switching data corresponding to the item number selected by the operator is read out. The control then proceeds to step S324.

At step S324, determination is made whether the obtained page number is equal to 0 or not. If the answer to the determination is YES, control proceeds to step S328, otherwise to step S325.

At step S325, the screen to be next displayed on LCD 10 is determined according to the obtained page number and the screen number. The control proceeds to step S326.

At step S326, bit map memory 8 is cleared. The control then proceeds to step S327.

At step S327, the display data representing the specified screen is read out from system memory 2, processed at CG 4, and transferred to bit map memory 8. The control proceeds to step S328.

At step S328, the code output flag of the item data table corresponding to the item number selected by the operator is read out. The control proceeds to step S329.

At step S329, determination is made as to whether the code output flag is equal to 0 or not. If the answer to the determination is YES, control proceeds to step S301, otherwise to step S330.

At step S330, the item number selected by the operator is provided to the host computer via I/F 14 (FIG. 14). Then the control proceeds to step S301.

With the programs having the above-mentioned structures executed by CPU 1, the calculator program, the clock display program, the full keyboard program and the like are executed by the item selection signal input apparatus independent of the host computer. After the determination of the execution of the special program, the screen is automatically restored to that prior to the execution of the special program. There is no transmission/reception of messages to or from the host computer during this period. Interruptive process can be carried out without increasing the load of the host computer.

The provision of the buzzer control code, the display control flag, and the character brightness reversion flag in the item data table allows the operator to select the reversion of the relative brightness of the key picture and to bleep a buzzer of a high or low sound by pressing a portion on the touch panel corresponding to a specific item. The inconvenience that any depression of the key will cause a buzzer to bleep or that the brightness of the display could not be reversed, which were seen in conventional apparatus are eliminated to provide an agreeable working environment for the operator. Reversing the display of the relative brightness of a particular key picture using a character brightness reversion flag can attract the attention of the operator by displaying a particular item in reversed brightness if necessary. If all the values of the output flag, the buzzer control code, and the display control flag are set to "0", dummy items can be displayed without data provision to the host computer, without the sounding of the buzzer, and without the reversion of the display. It is possible to create an item selection screen with extreme flexibility to implement an item selection signal input apparatus that can easily be adapted to objects of wider ranges.

In accordance with the present invention, the operator can execute a particular program by pressing a particular key corresponding to that special program. The screen can be restored to that prior to the special process by pressing the special key again. This process is carried out completely independent of the host computer. There is no disadvantage that the application program executed by the host computer is complicated. Furthermore, the item selection signal input apparatus according to the present invention can reduce the communication amount with the host computer compared with that of a conventional apparatus.

The switching to a new appropriate screen can be carried out solely by the item selection signal input apparatus according to the item selected by the operator. There is no need to receive screen switching commands from the host computer, resulting in further reduction in communication amount with the host computer.

It is possible to specify in advance whether to sound a buzzer or not, or reverse the relative brightness of a certain item picture when the corresponding item displayed on the item selection screen is selected, by providing a buzzer control code, a display control flag and the like in the data. The bleep of the buzzer may be switched to a plurality of sound levels. It is possible to ensure that the attention of the operator is aroused by sounding a buzzer or reversing the display of the brightness of a key picture regarding important items. The above-mentioned means for arousing attention may be provided for only arbitrary keys, which will allow the operator to carry out operation more agreeably compared with that of conventional cases where the buzzer is sounded every time a key is pressed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An item selection input apparatus enabling an operator to communicate with an external data processing device, comprising:

variable format display means having a display screen for displaying a selected one of a plurality of screen formats;

a transparent keyboard panel overlayed on said display screen and divided into a matrix of manually selectable zone panels, wherein each screen format is configured to identify plural item keys, each item key corresponding to one or more zone panels, and wherein when an operator selects a particular item key, a corresponding one of said zone panels provides a zone panel selection signal;

data storage means for storing screen format data representing said plurality of screen formats and an item input data table, indicative of a plurality of input data groups associated with a plurality of item keys, including for each input item data group a page number assigned to the group with one or more screens associated with each page number, and for each item key included in the input data group:

item key positioning data and item key size data to be associated with at least one zone panel, display text data for defining the symbols to be displayed corresponding to each item key, and coded digital data to be output in response to manual operation of each item key;

display control means responsive to said zone panel selection signal for controlling said variable format display means to select the next screen format out of said plurality of screen formats to display said selected next screen format on said display screen;

output means responsive to the operation of an item key of for accessing that portion of said item input data table corresponding to the page number associated with the selected item key and for providing coded digital data to said external data processing device;

said data storage means further including:

screen format identification signal means for storing and providing a screen format identification signal to identify said selected screen format; and next-screen-table storage means for storing a next screen table including screen format selection information including a page number for specifying the screen format to be displayed next depending upon the combination of said zone panel selection signal and said screen format;

retrieving means responsive to said screen format identification signal and said zone panel selection signal for searching said next screen table storage means to obtain a page number for identifying the screen format to be displayed next; and means for deriving screen format data provided by said retrieval means from said data storage means and providing the same to said variable format display means.

2. An item selection signal input apparatus enabling an operator to communicate with an external data processing device, comprising:

variable format display means having a display screen for displaying a selected one of a plurality of screen formats;

a transparent keyboard panel overlayed on said display screen and divided into a matrix of manually selectable zone panels, and wherein each screen format is configured to identify plural item keys, each item key corresponding to one or more zone panels, and wherein when an operator selects a particular item key, a corresponding one of said zone panels provides a zone panel selection signal;

data storage means for storing screen format data representing said plurality of screen formats and an item input data table, indicative of a plurality of input data groups associated with a plurality of item keys, including for each input data group, a page number assigned to the group with one or more screens associated with each page number, and for each item key included in an input data group:

item key positioning data and item key size data to be associated with at least one zone panel, display text data for defining the symbols to be displayed corresponding to each item key, coded digital data to be output in response to manual operation of each item key, and output flag data for determining whether or not the coded digital data should be transmitted to said external data processing device;

display control means responsive to said zone panel selection signal for controlling said variable format display means to select the next screen format out of said plurality of screen formats and to display said selected next screen format on said display screen;

output means responsive to the operation of an item key of for accessing that portion of said item input data table corresponding to the page number associated with the selected item key and for providing to said external data processing device coded digital data in accordance with the output flag data corresponding to the selected item key.

3. The item selection signal input apparatus according to claim 2, further comprising:

reception means for receiving data from said data processing device;

first drive means detachably receiving a first external memory device for driving said first external memory device and interfacing said first external memory device with said data storage means, said display control means and said output means; and second drive means for detachably receiving a second external memory device and for driving and interfacing said second external memory device with said data storage means, said display control means, and said output means.

4. The item selection signal input apparatus according to claim 3, further comprising means for transferring and writing the contents stored in said first external memory means attached to said first drive means to said second external memory means attached to said second drive means.

5. The item selection signal input apparatus according to claim 3, wherein said first external memory device comprises a RAM backed-up by a battery.

6. The item selection signal input apparatus according to claim 3, further comprising:

transfer means, connected to said first drive means and said second drive means, for transferring data from said first external memory device to said second external memory device.

7. The item selection signal input apparatus according to claim 2, wherein said data storage means further includes:

screen format identification signal means for storing and providing a screen format identification signal to identify a selected screen format, and next-screen-table storage means for storing a next screen table including screen format selection information including a page number for specifying the screen format to be displayed next based upon the combination of the value of said selection signal and said screen format;

retrieving means responsive to said screen format identification signal and said selection signal for searching said next screen table to obtain a page number for identifying the screen format to be displayed next, and means for deriving screen format data provided by said retrieval means from said data storage means and providing the same to said variable format display means.

8. The item selection signal input apparatus according to claim 2, wherein said data storage means includes:

screen format identification signal storage means for storing and providing a screen format identification signal to identify said selected screen format, attention attracting signal output means responsive to said selection signal and said screen format identification signal for providing an attention attracting signal having one of first and second values, and first attention attracting means for attracting the attention of the operator responsive to only said attention attracting signal having one of said first and second values.

9. The item selection signal input apparatus according to claim 8, wherein said attention attracting means comprises first sound generating means for generating a first predetermined sound.

10. The item selection signal input apparatus according to claim 9, wherein said first sound generating means comprises a buzzer.

11. The item selection signal input apparatus according to claim 9, wherein said attention attracting signal is provided to be able to take a third value different from either of said first or second values, said item selection signal input apparatus further comprises second attention attracting means responsive to said attention attracting means taking said third value for attracting the attention of the operator.

12. The item selection signal input apparatus according to claim 11, wherein said second attention attracting means comprises second sound generating means for generating a second predetermined sound different from said first sound.

13. The item selection signal input apparatus according to claim 12, wherein said second sound generating means comprises a buzzer.

14. The item selection signal input apparatus according to claim 8, wherein said attention attraction means comprises reversion means for reversing the relative brightness of a predetermined region on said display screen including points corresponding to said selected zone panel.

15. The item selection signal input apparatus according to claim 14, wherein said attention attracting means further comprises re-reversion means for reversing again the relative brightness of the region having its relative brightness reversed by said reversion means after an elapse of a predetermined time period.

16. The item selection signal input apparatus according to claim 2, further comprising specific one panel select detection means for detecting that said selection signal indicates one specific selection out of said zone panels, screen saving means responsive to the selection of said specific zone panel for saving information identifying the screen format displayed on said variable format display means, specific function executing means responsive to the selection of said specific zone panel for providing and displaying a specific screen on said variable format display means for executing a predetermined specific process independent of said data processing device, and restore means for restoring the screen prior to the selection of said specific zone panel on detecting the end of said specific process of said specific function executing means, according to information saved in said screen saving means identifying said screen format.

17. The item selection signal input apparatus according to claim 2, wherein said variable format display means comprises a liquid crystal display device for displaying an image in a dot arrangement, each dot representing a display pixel, a bit map memory for storing an image signal representing one pixel of said screen format to be displayed, means for reading out information representing the screen format selected by said display control means from said data storage means to generate an image signal representing one of each pixel of said screen format and writing the same into said bit map memory, and liquid crystal display device driving means for sequentially reading out image signals representing each pixel of said screen format from said bit map memory to drive said liquid crystal display device and displaying each image signal of said screen format at a corresponding dot on said liquid crystal display device.

18. An item selection signal input apparatus enabling an operator to communicate with an external data processing device, comprising:

variable format display means having a display screen for displaying a selected one of a plurality of screen formats;

a transparent keyboard panel overlayed on said display screen and divided into a matrix of manually selectable zone panels, wherein each screen format is configured to identify plural item keys, each item key corresponding to one or more zone panels, and wherein when an operator selects a particular item key, a corresponding one of said zone panels provides a zone panel selection signal;

data storage means for storing screen format data representing said plurality of screen formats and an item input data table, indicative of a plurality of input data groups associated with a plurality of item keys, including for each data group:
- a data group identifier,
- item key positioning data and item key size data to be associated with at least one zone panel,
- display text data for defining the symbols to be displayed on each item key,
- coded digital data to be output in response to manual operation of the item key, and
- next screen selection information;

display control means responsive to said zone panel selection signal and next screen selection information stored in said item input data table for controlling said variable format display means to select the next screen format out of said plurality of screen formats and to display said selected next screen format on said display screen; and output means responsive to the selection of an item key of said variable format display means for accessing that portion of the item input data table corresponding to the group identifier associated with the selected item key and for providing corresponding coded digital data to said data processing device.

19. The item selection signal input apparatus according to claim 18 further including first drive means detachably receiving a first external memory device and for driving said first external memory device and interfacing said first external memory device with said data storage means, said display control means and said output means, and transfer means for distributing and transferring the contents stored in said first external memory device attached to said first drive means to said data storage means, said display control means, and said output means.

20. The item selection signal input apparatus according to claim 19, further comprising reception means for receiving data from said data processing device, and means for writing said received data into said first external memory means attached to said first drive means.

21. The item selection signal input apparatus according to claim 19, wherein said first external memory means comprises a RAM backed-up by a battery.

22. The item selection signal input apparatus according to claim 18, wherein said data storage means includes means for storing a screen format identification signal to identify said selected screen format, said data storage means includes means for storing output suppress information indicating whether or not to transmit said coded digital data to said data processing device, and output suppress means responsive to said selection signal and said screen format identification signal for searching said data storage to derive the corresponding output suppress information for suppressing the transmission of said coded digital data to said data processing device by said output means according to the value of said derived output suppress information.

23. The item selection signal input apparatus according to claim 18, wherein said data storage means includes screen format identification signal storage means for storing and providing a screen format identification signal to identify said selected screen format;

attention attracting signal output means responsive to said selection signal and said screen format identification signal for providing an attention attracting signal having a plurality of possible values; and first attention attracting means for attracting the attention of the operator responsive to only said attention attracting signal being a predetermined one of said possible values.

24. The item selection signal input apparatus according to claim 23, wherein said attention attracting means comprises first sound generating means for generating a first predetermined sound.

25. The item selection signal input apparatus according to claim 18, further comprising:

specific zone panel select detection means for detecting that said selection signal indicates one specific selection out of said zone panels, screen saving means responsive to the selection of said specific zone panel for saving information identifying the screen format displayed on said variable format display means, specific function executing means responsive to the selection of said specific zone panel for providing and displaying a specific screen on said variable format display means for executing a predetermined specific process independent of said data processing device, and restore means for restoring the screen prior to the selection of said specific zone panel on detecting the end of said specific process of said specific function executing means, according to information saved in said screen saving means identifying said screen format.

26. The item selection signal input apparatus according to claim 18, wherein said variable format display means comprises a liquid crystal display device for displaying an image defined by an arrangement of dots, each dot representing a display pixel, a bit map memory including an arrangement of memory cells each storing an image signal representing one pixel of said screen format to be displayed, means for reading out information representing the screen format selected by said display control means from said data storage means to generate an image signal representing one of each pixel of said screen format and writing the same into said bit map memory, and liquid crystal display device driving means for sequentially reading out image signals representing each pixel signal of said screen format from said bit map memory to drive said liquid crystal display device and displaying each image signal of said screen format at a corresponding dot on said liquid crystal display device.

* * * * *